(12) United States Patent
Pesavento et al.

(10) Patent No.: US 11,321,547 B1
(45) Date of Patent: *May 3, 2022

(54) INVENTORY-CYCLE-BASED RFID TAG LOCATION

(71) Applicant: Impinj, Inc., Seattle, WA (US)

(72) Inventors: Alberto Pesavento, Seattle, WA (US); Thomas G. Anderl, Seattle, WA (US); Robert J. Ascani, Seattle, WA (US)

(73) Assignee: Impinj, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/113,186

(22) Filed: Dec. 7, 2020

Related U.S. Application Data

(63) Continuation of application No. 16/419,253, filed on May 22, 2019, now Pat. No. 10,860,819, which is a continuation of application No. 16/047,029, filed on Jul. 27, 2018, now Pat. No. 10,325,125, which is a continuation of application No. 15/818,735, filed on Nov. 20, 2017, now Pat. No. 10,061,950, which is a continuation of application No. 15/201,231, filed on Jul. 1, 2016, now Pat. No. 9,852,319.

(60) Provisional application No. 62/188,478, filed on Jul. 2, 2015.

(51) Int. Cl.
*G06K 7/10* (2006.01)
*G06Q 10/08* (2012.01)
*G06K 19/077* (2006.01)

(52) U.S. Cl.
CPC ..... *G06K 7/10366* (2013.01); *G06K 7/10128* (2013.01); *G06Q 10/087* (2013.01); *G06K 7/10178* (2013.01); *G06K 19/07749* (2013.01)

(58) Field of Classification Search
None
See application file for complete search history.

(56) References Cited

U.S. PATENT DOCUMENTS

| | | | |
|---|---|---|---|
| 7,456,726 | B2 | 11/2008 | Hansen et al. |
| 8,384,545 | B2 | 2/2013 | Hussain et al. |
| 9,013,307 | B2 | 4/2015 | Hussain et al. |
| 9,652,643 | B1 | 5/2017 | Pesavento et al. |
| 9,818,084 | B1 | 11/2017 | Diorio et al. |
| 9,852,319 | B1 | 12/2017 | Pesavento et al. |
| 2002/0111819 | A1 | 8/2002 | Li et al. |

(Continued)

OTHER PUBLICATIONS

Ex Parte Quayle Action for U.S. Appl. No. 15/201,231 dated Jul. 28, 2017, pp. 6.

(Continued)

*Primary Examiner* — Thomas S McCormack
(74) *Attorney, Agent, or Firm* — Hertzberg, Turk & Associates, LLC

(57) ABSTRACT

Techniques are provided to estimate the location of an RFID tag using tag read information, such as a tag read count or a tag read rate, and an opportunity metric, such as an inventory cycle duration, inventory cycle rate, or inventory cycle count. A tag tracking system determines read information for a tag in a zone and an opportunity metric associated with the tag and the zone. The tag tracking system then computes a success rate based on the tag read information and opportunity metric, and uses the success rate to estimate the location of the tag.

14 Claims, 17 Drawing Sheets

(56) References Cited

U.S. PATENT DOCUMENTS

2010/0039228 A1\* 2/2010 Sadr .................. G06K 7/10366
340/10.1
2015/0339901 A1 11/2015 Shull
2017/0228688 A1 8/2017 Bourlon

OTHER PUBLICATIONS

Non-Final Action for U.S. Appl. No. 15/818,735 dated Jan. 12, 2018, pp. 11.
Non-Final Action for U.S. Appl. No. 16/047,029 dated Aug. 29, 2018, pp. 11.
Non-Final Action for U.S. Appl. No. 16/419,253 dated Apr. 15, 2020, pp. 13.

\* cited by examiner

| | 1402 | 1404 | 1406 | 1408 | 1410 |
|---|---|---|---|---|---|
| | | | | | |
| 1420 Begin Cycle w. Query | 0 | 3 | 1 | 2 | 3 |
| 1422 QueryRep | X | 2 | 0 | 1 | 2 |
| 1424 QueryRep | X | 1 | X | 0 | 1 |
| 1426 QueryRep | X | 0 | X | X | 0 |
| 1428 QueryAdj | X | 1 | X | X | 0 |
| 1430 QueryRep | X | 0 | X | X | X |
| 1432 QueryRep | X | X | X | X | X |
| 1434 QueryAdj | X | X | X | X | X |

Time

FIG. 14

Completed inventory cycles in zone 1310 over time T: 1
Completed inventory cycles in zone 1320 over time T: 18

Read count of tag 1302 in zone 1310 over time T: 1
Read count of tag 1302 in zone 1320 over time T: 16

Success rate of tag 1302 for zone 1310: 1/1
Success rate of tag 1302 for zone 1320: 16/18

Rough location estimate: location 1506, somewhat closer to zone 1310 than zone 1320.

INVENTORY-CYCLE-BASED RFID TAG LOCATION

CROSS REFERENCE TO RELATED APPLICATIONS

This Application is a continuation under 35 U.S.C. § 120 of co-pending U.S. patent application Ser. No. 16/419,253, filed on May 22, 2019, which is a continuation under 35 U.S.C. § 120 of U.S. patent application Ser. No. 16/047,029, now U.S. Pat. No. 10,325,125, filed on Jul. 27, 2018, which is a continuation under 35 U.S.C. § 120 of U.S. patent application Ser. No. 15/818,735, now U.S. Pat. No. 10,061,950, filed on Nov. 20, 2017, which is a continuation under 35 U.S.C. § 120 of U.S. patent application Ser. No. 15/201,231, now U.S. Pat. No. 9,852,319, filed on Jul. 1, 2016, which claims the benefit of U.S. Provisional Patent Application Ser. No. 62/188,478 filed on Jul. 2, 2015. The disclosures of the above patent application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the inventorying. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to estimating the location of an RFID tag using tag read information, such as a tag read count or a tag read rate, and an opportunity metric, such as an inventory cycle duration, inventory cycle rate, or inventory cycle count. A tag tracking system determines read information for a tag in a zone and an opportunity metric associated with the tag and the zone. The tag tracking system then computes a success rate based on the tag read information and opportunity metric, and uses the success rate to estimate the location of the tag.

According to some embodiments, a method for a Radio Frequency Identification (RFID) system to estimate a location of an RFID tag is provided. The method may include transmitting a first inventorying RF wave to a first zone, counting a first nonzero number of response from the RFID tag in the first zone, and determining a first success rate based on the first nonzero response count and a first opportunity metric associated with the first zone. The method may further include transmitting a second inventorying RF wave to a second zone different from but overlapping the first zone, counting a second nonzero number of responses from the RFID tag in the second zone, and determining a second success rate based on the second nonzero response count and a second opportunity metric associated with the second zone. The method may further include estimating the tag location within an overlapping portion of the first and second zones based at least one a comparison of the first and second success rates.

According to other embodiments, another method for a Radio Frequency Identification (RFID) synthesized-beam reader (SBR) system to estimate a location of an RFID tag is provided. The method may include transmitting a first inventorying RF wave in a first SBR beam, receiving a first nonzero number of responses from the RFID tag in the first SBR beam, and determining a first success rate based on the first response count and a first opportunity metric. The method may further include transmitting a second inventorying RF wave in a second SBR beam, receiving a second nonzero number of responses from the RFID tag in a second SBR beam different from but overlapping the first SBR beam, and determining a second success rate based on the second response count and a second opportunity metric associated with the second SBR beam. The method may further include estimating the tag location within an overlapping portion of the first and second SBR beams based on a comparison between the first success rate and the second success rate.

According to further embodiments, a method for a Radio Frequency Identification (RFID) system to estimate a location of an RFID tag with respect to an inventory zone generated by the RFID system is provided. The method may include transmitting an inventorying RF wave in the inventory zone, counting a nonzero number of responses from the RFID tag in the inventory zone, and determining a current success rate based on the nonzero response count and an opportunity metric associated with the inventory zone. The method may further include determining an expected success rate associated with the RFID tag and estimating the tag location with respect to the inventory zone based on the current success rate and the expected success rate.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 14 depicts an example of an inventory cycle according to embodiments.

DETAILED DESCRIPTION

Figure 1:
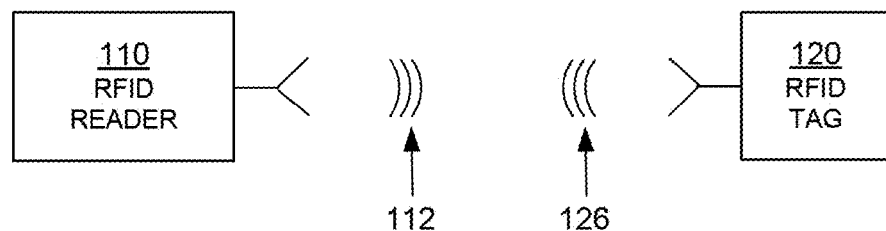
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

RFID tags and readers interact by exchanging messages encoded in RF waveforms by transmission (e.g., in the case of readers and active or powered tags) or backscatter (e.g., in the case of passive tags). Successful tag-reader interactions may include the successful receipt of a reader message from a reader by a tag, the successful receipt of a tag message from a tag by a reader, and/or the combination of the successful receipt of a reader message by a tag and the subsequent successful receipt of a tag message responding to the reader message by the reader. In some embodiments, the latter may be described as a "tag read", and a successful tag read may mean that a reader successfully receives a response (i.e., a message) from a tag responding to a previously-sent reader message, whereas an attempted tag read may mean that a reader previously sent a message to one or more tags but did not receive any responses.

The probability that a tag read will be successful may depend on a number of different factors, such as the antenna type of the tag, the orientation of the tag, the presence of other tags, the power available to the tag, the power of the signal transmitted from a reader, the distance of the tag from a reader, the presence of RF interference from other RF emitters or environmental noise, environmental conditions, physical obstructions, the transmission medium, or any other factor that could affect RF signal propagation. In some embodiments, the likelihood or probability of a successful tag read may be represented by a tag visibility parameter. The visibility of a tag may indicate the probability that a reader will successfully receive a response to a previous reader command from the tag, and may vary according to the factors described above. In some embodiments, the visibility of a tag may be reflected in the tag's read characteristic, which represents attempted and successful tag reads over time.

In many situations, a tag's visibility (and therefore read characteristic) may vary depending on whether the tag is physically located within a particular volume of space and/or where the tag is physically located within the particular volume of space. Accordingly, a tag tracking system that detects a tag may be able to estimate whether the tag is in a particular volume of space and/or where the tag is located within the particular volume of space based on the tag's detected read characteristic.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals). Tag 120 can be a passive tag, or an active or battery-assisted tag (i.e., a tag having its own power source). When tag 120 is a passive tag, it is powered from signal 112.

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Figure 2:
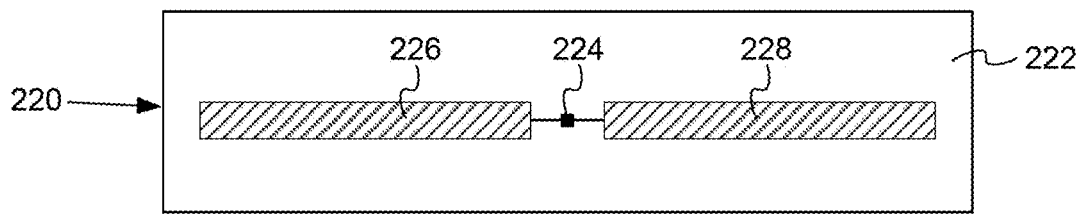
FIG. 2 is a diagram showing components of a passive RFID tag, such as a tag that can be used in the system of FIG. 1.
Figure 2:
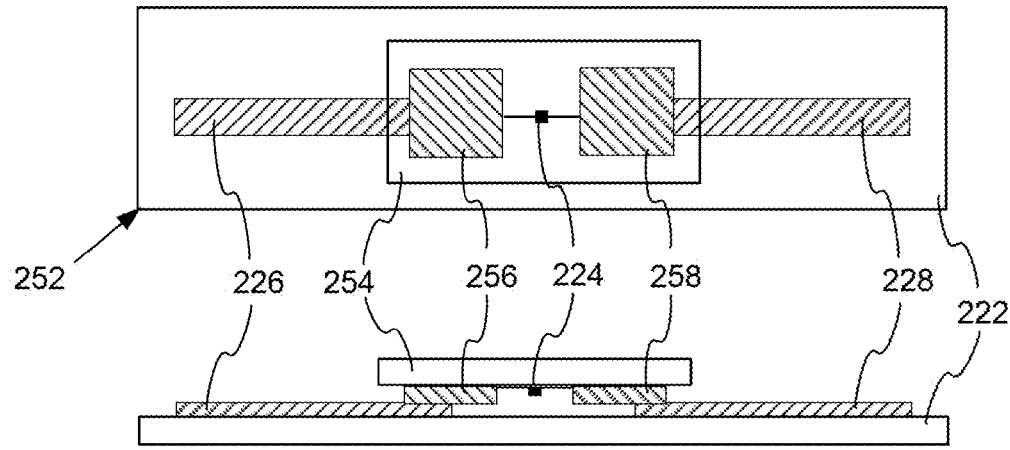
Figure 2:
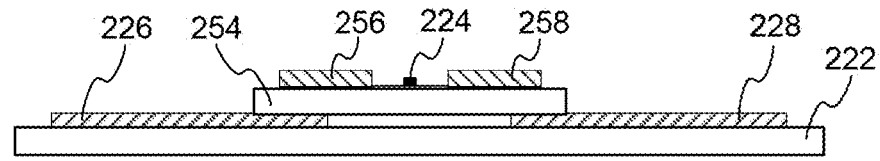

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
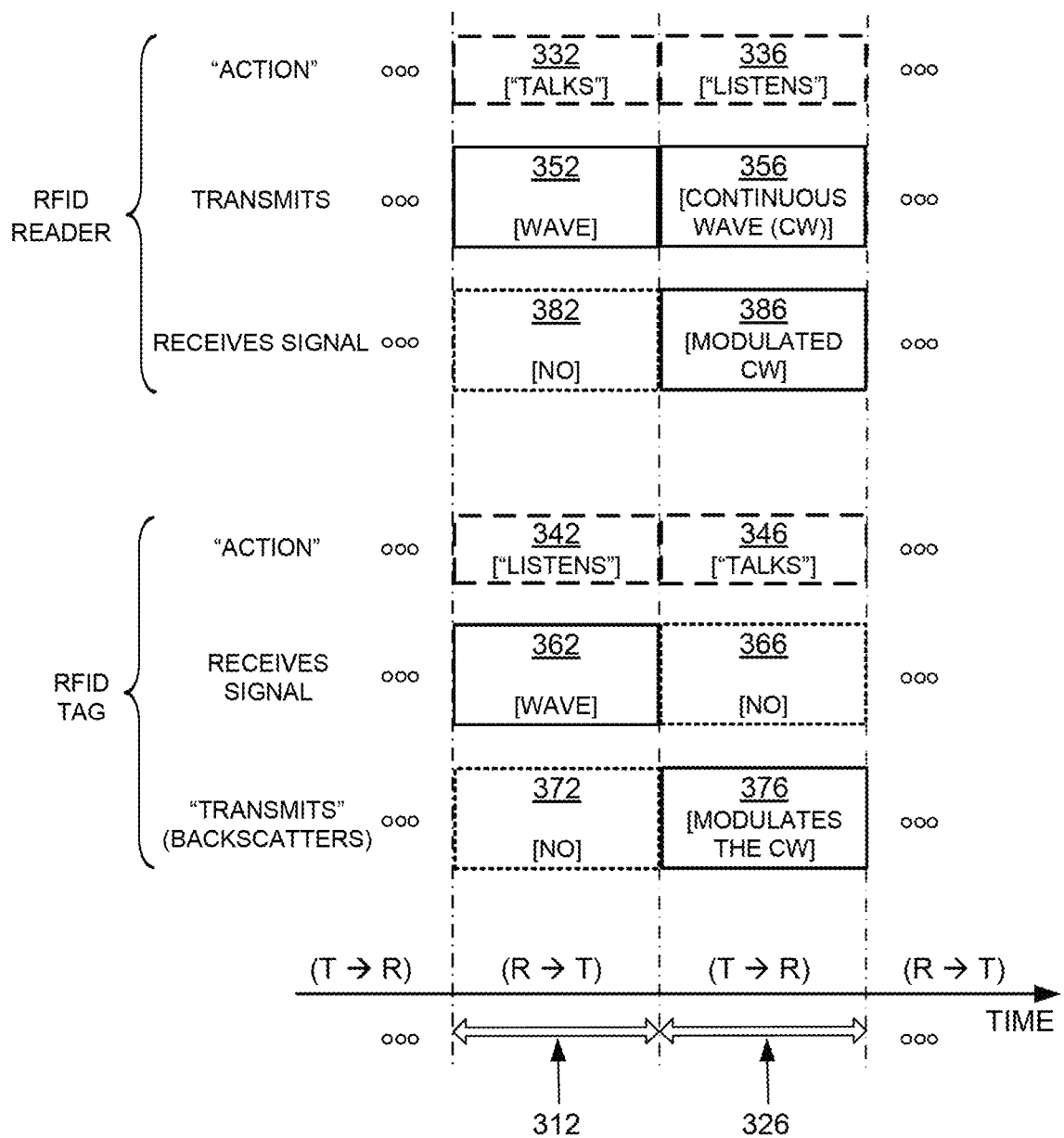
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
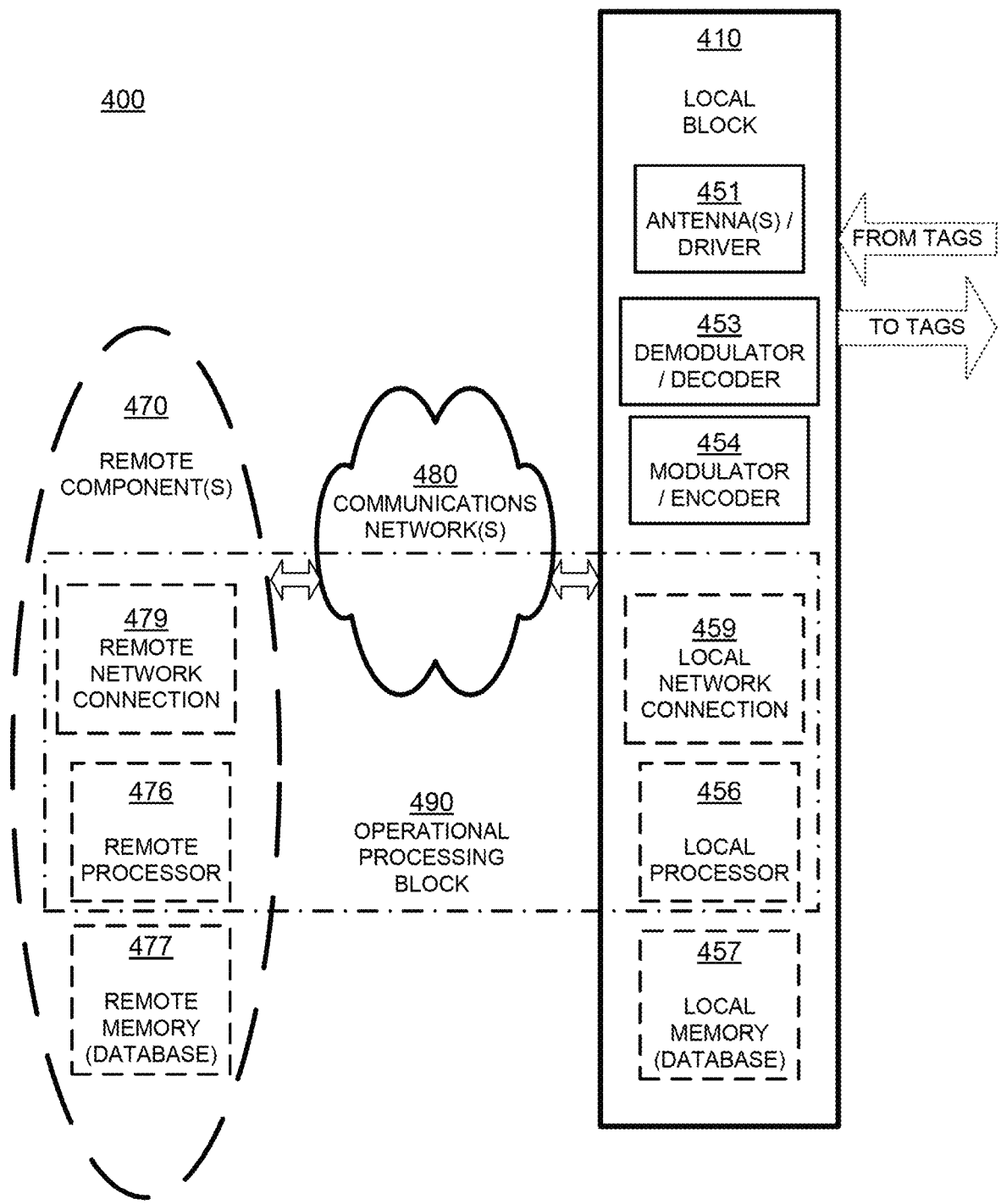
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. For example, local block 410 or portions of local block 410 may be implemented as a standalone device or as a component in another device. In some embodiments, local block 410 or portions of local block 410 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

In some embodiments, one or more of the blocks or components of reader system 400 may be implemented as integrated circuits. Local block 410, one or more of the components of local block 410, and/or one or more of the remote component 470 may be implemented in CMOS technology, BJT technology, MESFET technology, and/or any other suitable implementation technology.

Local block 410 is responsible for communicating with RFID tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 451 may be a phased-array antenna or synthesized-beam antenna (SBA), described in more detail below, and local block 410 may be implemented in a synthesized-beam reader (SBR) configured to generate one or more beams via the SBA. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, encryption/authentication algorithms, algorithms for tracking tag location or movement, secret keys, key pairs, individual public and/or private keys, electronic signatures, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480, or may couple to a separate device or component configured to communicate with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They may communicate with each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an encryption/authentication function and/or a tag location/tracking function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

Of the above-described elements, it may be useful to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
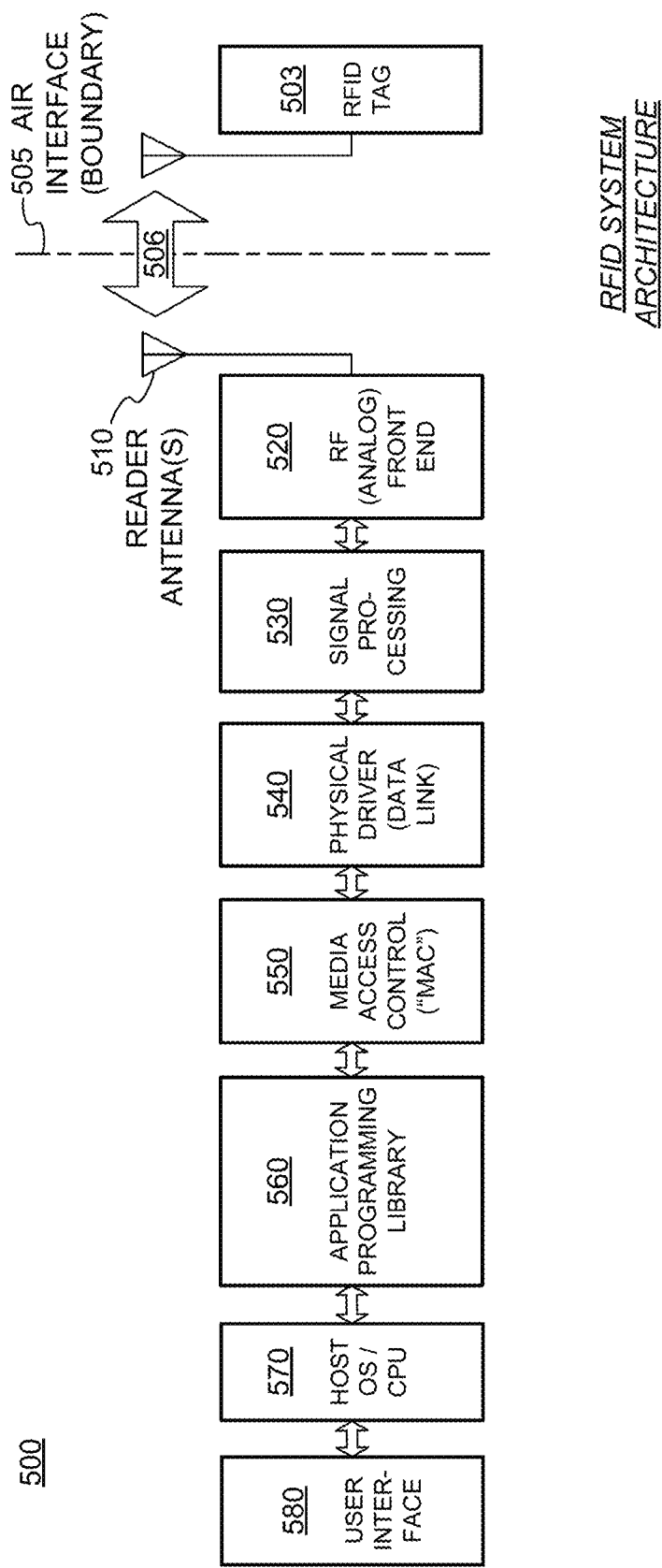
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 further includes a physical-driver module 540, which is also known as a data-link module. In some embodiments physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to estimating the location of RFID tags. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
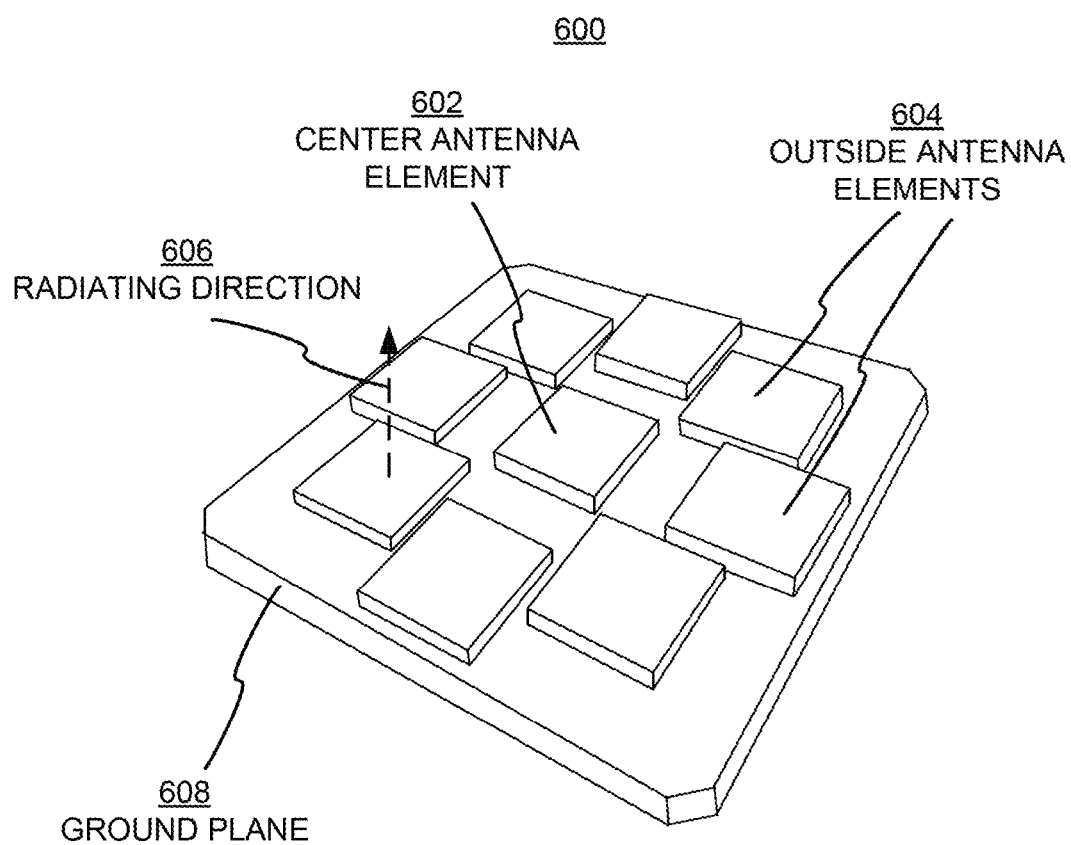
FIG. 6 depicts a discrete-element antenna array according to embodiments.

One or more RFID readers, or distributed portions of one or more readers, may be coupled to or embedded within an antenna array to form a synthesized-beam reader (SBR) capable of generating multiple RF beams. FIG. 6 depicts a perspective view of an antenna array 600 with discrete radiating elements according to embodiments. Antenna array 600 includes an array of antenna elements 602 and 604, and a ground plane 608 behind elements 602 and 604. Each element has a radiating direction vector 606 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 602 and 604. The direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the signal to be transmitted and then direct the generated signal to elements 602 and 604 with different amplitudes and phases. Alternatively, the SBR may synthesize the different signals for each antenna element digitally and then convert the digital signals to analog. In other embodiments the SBR may use a mix of these approaches. Similarly, during a receive operation the SBR may combine analog signals after appropriate phase shifting and amplitude adjustment of each, or it may digitize the signals from each element and combine them digitally, or a mix thereof.

The antenna elements of SBA 600 may be one or more of patch, slot, wire, horn, helical, distributed, or any other type as will be known to those skilled in the art. Whereas FIG. 6 only shows nine antenna elements, antenna arrays with any number of antenna elements may be used, including a single distributed element or an element made from metamaterials. In some embodiments ground plane 608 may be nonplanar (e.g., curved, concave, convex, etc.) and in other embodiments need not exist.

Figure 7A:
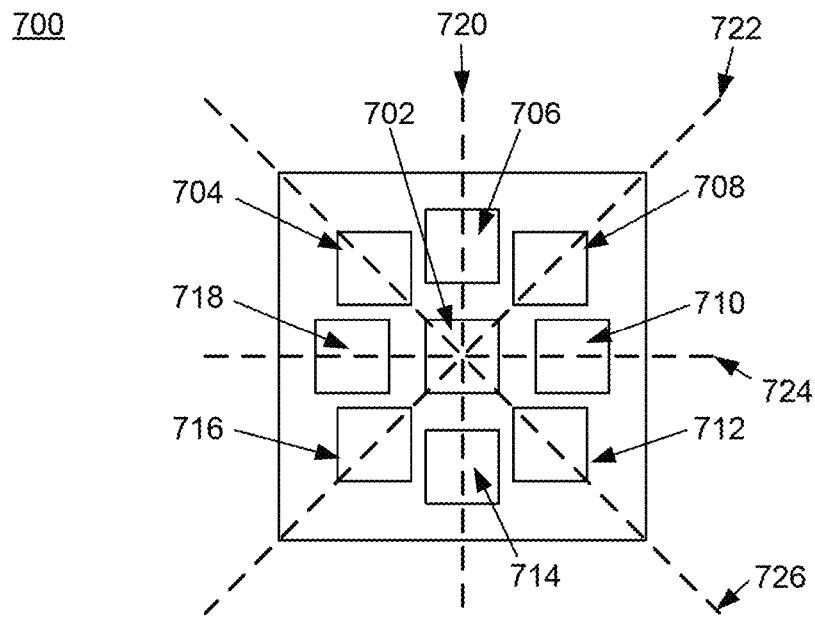
FIGS. 7A and 7B depict the antenna array of FIG. 6 synthesizing a beam in different physical directions, according to embodiments.
Figure 7B:
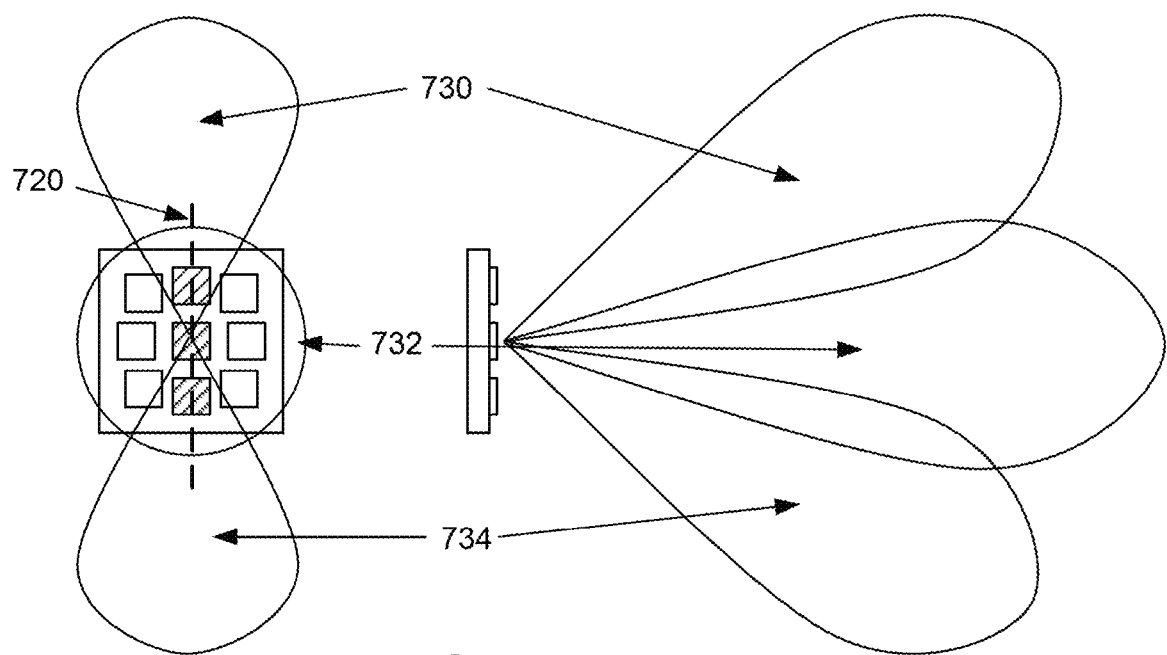

FIGS. 7A and 7B show the directions of some of the RF beams that SBA 700, similar to SBA 600 in FIG. 6, can generate. SBA 700 has nine antenna elements 702-718, with element 702 at the center and elements 704-718 around it. The shape and direction of the beam that SBA 700 generates depends on the signals to/from each element. Suppose that SBR 700 transmits using primarily elements 702, 706, and 714. Then, depending on the amplitude and phase of the signals applied to these elements, SBA 700 can steer a beam along the direction indicated by dashed line 720. In a similar fashion, suppose that SBR 700 transmits primarily using elements 702, 708, and 716. Then, depending on the amplitude and phase of the signals applied to these elements, SBA 700 can steer a beam along the direction indicated by dashed line 722. Of course, other steering arrangements are possible, including using all 9 elements to transmit and/or receive in arbitrary directions and to generate narrow beams.

FIG. 7B shows how RF beams with different directions can be synthesized using antenna elements located along line 720, with the diagram to the left depicting a head-on view similar to FIG. 7A and the diagram to the right depicting a side view. As described above, the beam direction can be controlled by varying the amplitude and phase of the signals to/from the antenna elements. For example, by applying a leading signal phase to element 706, an intermediate signal phase to element 702, and a trailing signal phase to element 714, the SBA will tend to steer its beam downward as in beam 734. Switching leading and lagging from elements 706/702 to elements 702/706 will tend to steer the beam upwards as in beam 730. Of course, the actual beam shape depends on both the magnitude of the phase shifting and the magnitude of the amplitude scaling (if any).

Figure 8:
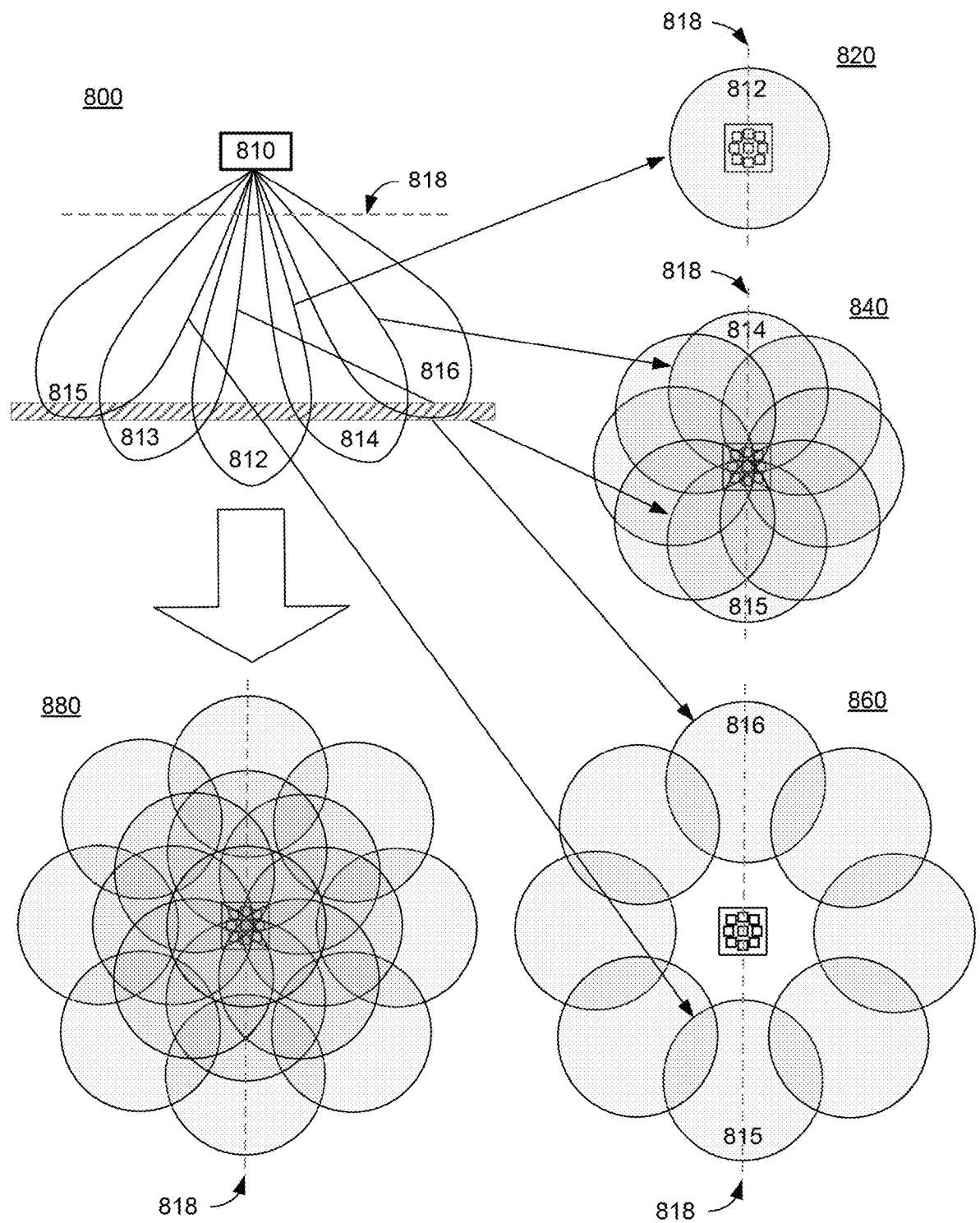
FIG. 8 depicts some of the potential beam locations that can be synthesized by the antenna array of FIG. 6, according to embodiments.

FIG. 8 depicts potential beams from an SBR according to embodiments. Diagram 800 depicts a side perspective of SBR 810, capable of synthesizing at least five different RF beams 812, 813, 814, 815, and 816, arranged along line 818 (similar to line 720 in FIG. 7A), with each RF beam pointed in a different direction.

Diagrams 820, 840, 860, and 880 depict coverage areas, shown as shaded circles, of the beam patterns generated by SBR 810. A beam generated by an SBR (or by any reader) has a coverage volume, also known as the beam's "field-of-view" (FoV), which is a volume in three-dimensional space where, during transmission, the transmitted energy density exceeds a threshold, and where, during receiving, the received energy density exceeds a threshold. A beam's coverage area is a projection of the beam's FoV on a surface. The FoV and coverage area may be different during transmit and receive, and may vary with reader or tag power, the thresholds, the distance between the SBR and the surface, and other parameters.

Diagram 820 depicts the coverage area of central beam 812. Diagram 840 depicts the coverage areas of the inner beams such as 814 and 815. Diagram 860 depicts the coverage areas of the outer beams such as 815 and 816. Finally, diagram 880 depicts the total coverage area of all the beams formed by SBR 810. As shown in diagrams 820-880, beam coverage areas may overlap. For example, inner beam 814 may overlap with the central beam 812, with one or more other inner beams, and with one or more other outer beams. In this disclosure, two areas, volumes, or zones overlap when at least a portion of one area, volume, or zone falls within or coincides with at least a portion of the other area, volume, or zone.

Whereas SBR 810 is depicted as being able to generate and switch between five beams on an axis (e.g., axis 818), in other embodiments an SBR may generate and switch between more or fewer beams on any given axis. Similarly, whereas SBR 810 is depicted as being able to generate beams on four different axes (e.g., axes 720, 722, 724, and 726 in FIG. 7A), in other embodiments an SBR may be configured to generate beams on more or fewer axes. An individual beam's coverage area in FIG. 8 and subsequent figures is depicted as circular for simplicity, and in actuality may be of any suitable shape, and may vary based on interactions between the different elements that form the beam, as well as the orientation and topology of the surface on which the coverage area is projected. For example, a beam may have a non-circular coverage area. As another example, a circular beam that illuminates a surface with a non-perpendicular angle may project an elliptical coverage area on the surface.

In general, an SBR synthesizes an RF beam to point at locations (e.g. beam areas-of-coverage shown in FIG. 8), for durations, and at times according to a scanning pattern, which may be predetermined or dynamic. A pointing location can be identified by the one or more SBRs as a beam indicator (such as a numeric indicator), a location on the floor of a facility in which the SBRs are located, a set of Cartesian or polar coordinates, or any other suitable location identifier.

In some embodiments, the scan pattern is a sequence of target locations and an SBR may synthesize beams to point at the different target locations based on a timer, a trigger signal generated by the SBR or a controller, and/or communications from one or more other readers. In some embodiments, the scan pattern is at least one target location and at least one corresponding target-location time, defined as the time at which two different SBRs point to the target location. The target-location time may be absolute (for example, 4:00 pm) or relative (for example, ten milliseconds after a trigger or timer signal or communication). An SBR may store the scan pattern in memory, receive a scan pattern from a controller (a separate controller module, another reader/SBR, a network device, or some other controlling entity), generate a scan pattern using information received from a controller or other readers, generate a scan pattern randomly, or generate a scan pattern based on any other suitable parameter(s). In some embodiments, an SBR's scan pattern may be overridden temporarily (or permanently) by a controller or another reader.

Figure 9:
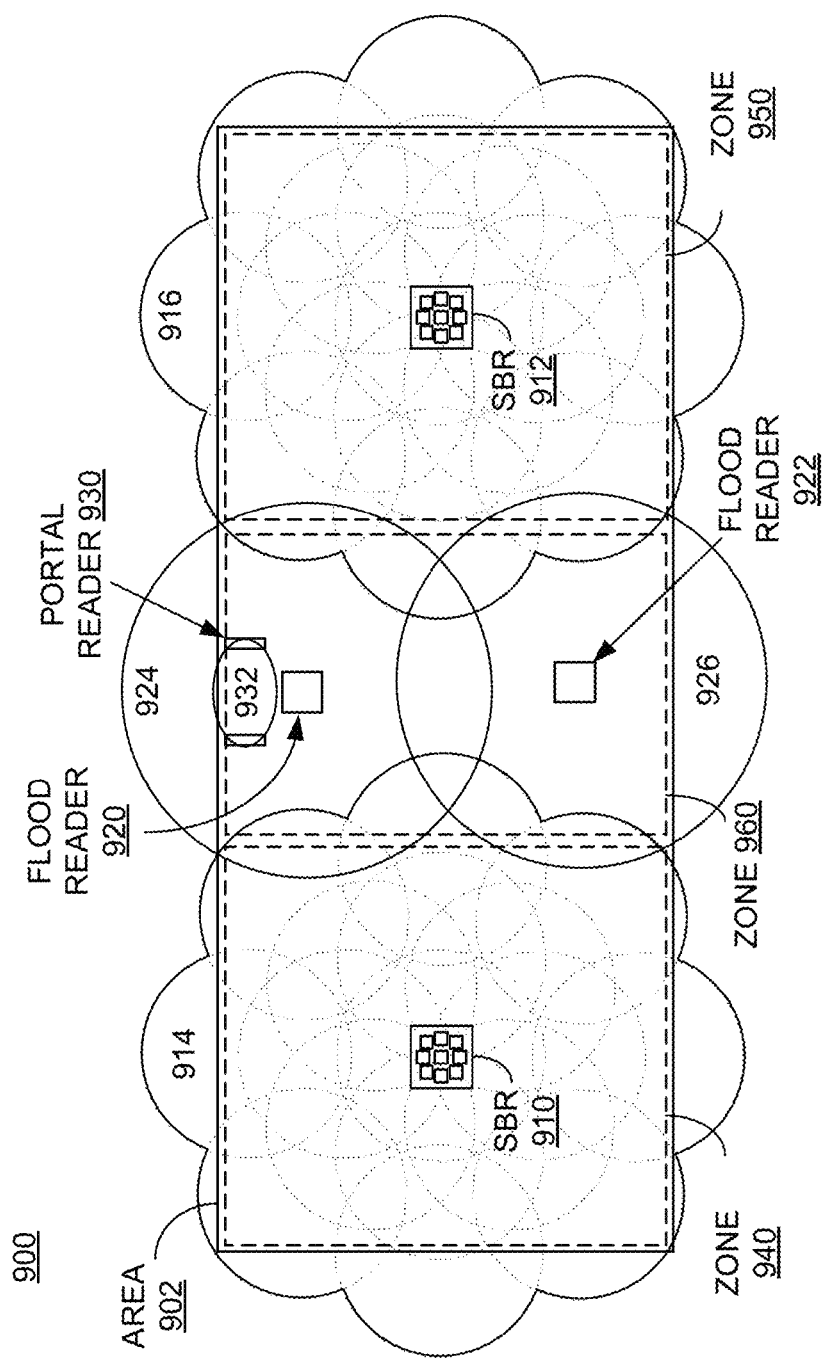
FIG. 9 illustrates how multiple readers and antennas may be used to provide multiple zones within a space, according to embodiments.

In some embodiments, multiple readers or antennas may be combined to detect and inventory tags or tagged items over a particular area or volume. FIG. 9 illustrates how multiple readers and antennas may be used to provide multiple zones within a space 902, according to embodiments. Diagram 900 is a top-down view of space 902, which may represent part or all of a facility such as a building, yard, retail store, laboratory, warehouse, construction facility, plant, military base, airport, ship, parking lot, shipping container, portion or section of the above, a location within or associated with one of the above, or similar. In some embodiments, readers and antennas may be deployed to provide coverage of at least a portion of space 902, if not substantially the entire space 902. For example, SBRs 910 and 912, flood readers 920 and 922, and a portal reader 930 may be deployed to provide coverage in space 902.

Each of the readers or antennas deployed in space 902 may be configured to provide a particular coverage volume. For example, SBRs 910 and 912, similar to those described above, may be mounted to provide coverage volumes 914 and 916, represented in diagram 900 as a projection of the coverage volumes on a surface (e.g., the floor of the space 902). In some embodiments, SBRs 910/912 may be mounted on or suspended from a ceiling or a standalone support and oriented downward, or may be mounted on or under a floor and oriented upward. Flood readers 920 and 922, unlike SBRs, may be configured to each generate a single, relatively static beam. Similar to SBRs 910/912, flood readers 920 and 922 may be mounted to provide coverage volumes 924 and 926. Portal reader 930, which may be configured to read tags passing through a relatively narrow area such as a corridor or entrance, may be mounted on a stand, to a wall, in the ceiling or floor, or adjacent to a doorway or portal (above, below, or to the sides) to provide coverage volume 932. In some embodiments, portal reader 930 may include an SBR, which may be counted to a wall or on a stand and configured to provide coverage volumes oriented at least partially laterally or sideways. While in diagram 900 each coverage volume is associated with a reader, in other embodiments a coverage volume may be associated with an antenna. In these embodiments, a single reader may be coupled to multiple antennas, each of which have an associated coverage volume.

In some embodiments, space 902 may also be divided into one or more zones, such as zones 940, 950, and 960. A zone may be a particular volume of space defined for inventorying purposes, and is also referred to herein as an inventory zone. A zone may correspond exactly to a reader/antenna coverage volume, may include portions of or all of multiple coverage volumes, or may correspond to part of a coverage volume. In some embodiments, zones may correspond to particular regions in a facility. For example, different rooms, corridors, entrances, and exits in a building, or portions of the preceding, may be different zones. As another example, individual fixtures, such as shelving units, individual shelves, cabinets, or tables may be separate zones. In some embodiments, different parts of an individual fixture (e.g., different sections of a shelf) may be different zones.

Figure 10:
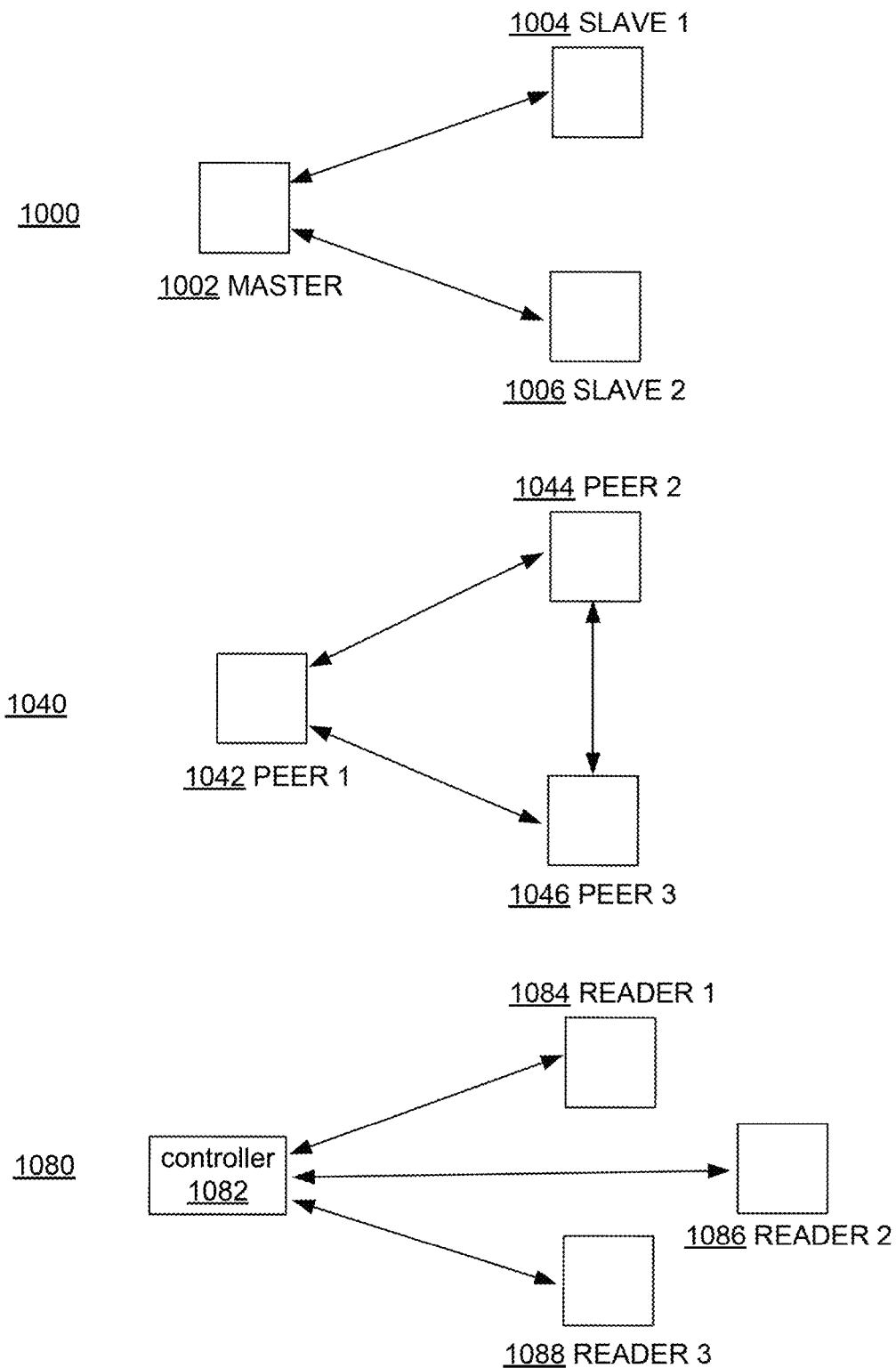
FIG. 10 depicts methods of controlling multiple readers according to embodiments.

In some embodiments, multiple readers within a space such as space 902 may be configured to exchange information with each other about target locations, scan patterns, scan timing, beam configuration (for SBRs), tags, and roles. FIG. 10 depicts a variety of ways in which readers can receive and/or exchange such information. Diagram 1000 depicts a first configuration in which a master reader 1002 coordinates the operations of two slave readers 1004 and 1006. Diagram 1040 depicts a second configuration in which three readers 1042, 1044, and 1046 coordinate operation via peer-to-peer communications. Diagram 1080 depicts a third configuration in which a centralized controller 1082 coordinates the operations of three readers 1084, 1086, and 1088. Of course, multiple variants on these themes are possible including using more or less readers; mixing the configuration (for example, a controller coordinating peer-to-peer communications); using multiple controllers, and many other combinations as will be obvious to those of ordinary skill in the art. Communication between readers and controllers (if present) can be implemented using a wired connection (e.g., Ethernet, parallel, serial, or other suitable wired protocol), a wireless connection (e.g. WiFi, cellular, Bluetooth, or other suitable wireless protocol), a point-to-point protocol, a packet or address-based protocol, or any other suitable connection type or protocol.

Figure 11:
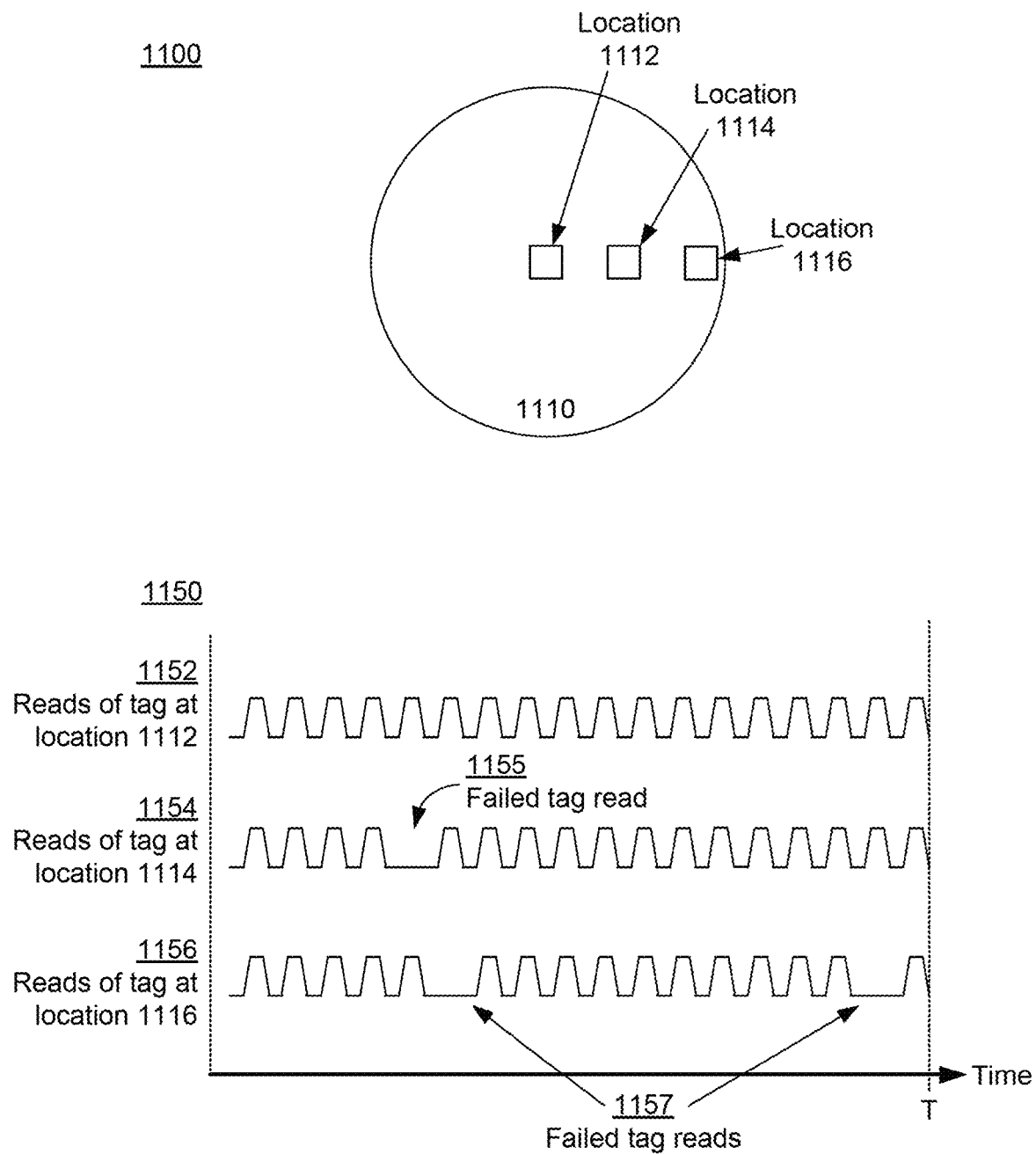
FIG. 11 depicts how tag read characteristics differs depending on the location of a tag within a zone or coverage volume.

As described above, the visibility and read characteristic of a tag may vary based on the physical location of the tag within a zone or coverage volume. FIG. 11 depicts how tag read characteristics differs depending on the location of a tag within a zone or coverage volume. Diagram 1100 is a top-down view of zone 1110, which may be the coverage volume of a single reader or antenna (e.g., coverage volume 924), a portion of a coverage volume, or a combination of multiple coverage volumes or portions of multiple coverage volumes. Zone 1110 is substantially circular, and may correspond to a beam generated by a reader, reader antenna, or SBR disposed such that the visibility of a tag located near the center of zone 1110 is relatively high and gradually decays as a tag's location moves toward the periphery of zone 1110.

Diagram 1100 also depicts a number of different tag locations 1112, 1114, and 1116. In this disclosure, a tag location refers to a point or area in three-dimensional space occupied by a tag or tagged item. As such, every tag location may be defined by a set of coordinates based on an appropriate coordinate system, such as Cartesian, polar, etc. Each of the tag locations 1112-1116 is within the zone 1110, but may be associated with different visibilities. For example, a tag at location 1112 in the middle of zone 1110 may have higher visibility to a reader generating zone 1110 than a tag at location 1116 near the periphery of zone 1110, while a tag at location 1114 may have lower visibility than a tag at location 1112 but higher visibility than a tag at location 1116. In general, the visibility of a tag to a reader may be correlated with the distance between the tag and the reader. For example, a tag that is relatively close to a reader may have a relatively high visibility to the reader, whereas another tag that is relatively far from the reader may have a relatively low visibility to the reader.

Diagram 1150 illustrates read characteristics for tags at locations 1112, 1114, and 1116, which represent attempted and successful tag reads over a particular time interval T. A reader (or readers) covering zone 1110 may attempt to read a tag within zone 1110 by, for example, transmitting an inventorying RF wave to zone 1110, where an inventorying RF wave is an RF wave configured to cause one or more receiving tags to respond with identifier(s). The inventorying reader may receive a response from the tag, in which case the tag read attempt is considered successful, or the inventorying reader may fail to receive a response from the tag, in which case the tag read attempt is considered unsuccessful. In some embodiments, the reader may perform a series of read attempts, a nonzero number of which are successful and some of which may be unsuccessful, and may count the nonzero number of successful tag reads (or analogously the nonzero number of responses received from the tag) as well as the total number of read attempts (successful and unsuccessful). The reader may also record the time interval T over which the read attempts were made.

In some embodiments, the reader may then compute a success rate for the tag based on the tag read count (or response count) and an opportunity metric. The success rate represents how successful the reader has been when attempting to read the tag, as a function of time or some other parameter. The opportunity metric represents the opportunities or chances the reader has had to potentially read the tag, and may be based on a continuous or a discrete parameter. In some embodiments, the opportunity metric may be a continuous time interval in which a reader could potentially read a tag. For example, the opportunity metric may be the time interval T. In this case, the reader may compute the success rate as a read rate, defined as the number of successful tag reads over a time interval, by dividing the tag read count (the number of successful tag reads or the number of tag responses received) by the time interval T.

When the reader covering zone 1110 attempts to read a tag at location 1112 in the middle of zone 1110, most if not every read attempt over time interval T may succeed, as depicted by read characteristic 1152, resulting in a relatively high tag read count. In this situation, the success rate of the tag at location 1112 may be relatively high. When the reader attempts to read a tag at location 1114, as depicted by read characteristic 1154, it may still mostly succeed. However, some read attempts 1155 may fail, leading to an increased ratio of failed reads (1155) to successful reads over time T and a correspondingly lower success rate than associated with read characteristic 1152. When the reader attempts to read a tag at location 1116 near the periphery of zone 1110, as depicted by read characteristic 1156, although a nonzero number of read attempts succeed, even more read attempts 1157 may fail, further increasing the ratio of failed reads (1157) to successful reads over time T and reducing the success rate as compared to read characteristics 1152 and 1154. Accordingly, the success rate for tag read attempts within zone 1110 may vary based on tag location within zone 1110.

In some embodiments, a reader may also be able to read tags outside zone 1110. For example, zone 1110 may only constitute a portion of the reader-generated beam. As a result, a tag may be located within the FoV of the reader-generated beam but not within zone 1110. Accordingly, the tag may respond to read attempts from the reader despite being outside of zone 1110. In these embodiments, the success rate associated with a tag outside zone 1110 may be related to the extent to which the tag is outside a boundary of zone 1110.

Tag tracking systems may use these relationships between tag success rate and location within or outside of a zone to determine whether a particular tag is within the zone and/or estimate or roughly determine the location of the particular tag within the zone. In some embodiments, a tag tracking system may have knowledge of expected success rates associated with different tags and/or different locations within or outside of a zone. An expected success rate may be a success rate that a reader would expect to observe when attempting to inventory a particular tag or kind of tag at a particular location, and in some embodiments may be based on historical and/or calculated data. Upon detecting a tag at a particular time, the tag tracking system may determine a current success rate associated with the tag, where the current success rate is a success rate determined based on tag reads or received responses at, around, or near the particular time. The tag tracking system may then compute or retrieve expected success rates associated with different locations inside and outside the zone and compare the current success rate with each of the expected success rates. The tag tracking system may then estimate the tag's location based on the location(s) associated with the expected success rate(s) that most closely match the current success rate.

For example, suppose that a tag tracking system is attempting to estimate the location of a tag currently within zone 1110. The tag tracking system may have previously knowledge of expected success rates associated with locations 1112, 1114, and 1116 within zone 1110. Upon determining a current success rate associated with the tag (e.g., by counting successful tag reads or received responses over a period of time and dividing by an opportunity metric), the tag tracking system may be able to compare the current success rate to the expected success rates to estimate the location of the tag. For example, if the tag tracking system determines that the current success rate is similar to the expected success rate at location 1114, then the tag tracking system may estimate that the tag is located at or near location 1114. As another example, if the tag tracking system determines that the current success rate is somewhat similar to both the expected success rates at locations 1114 and 1116, the tag tracking system may estimate the current location of the tag as somewhere in between locations 1114 and 1116.

In some embodiments, the tag tracking system may further refine the location estimation based on some other technique or parameter, such as interpolation, averaging, knowledge of the physical configuration associated with the locations 1114/1116 and/or zone 1110, historical detection data associated with the tag, other data associated with the tag (e.g., purchase data, type of tag, type of item associated with the tag, etc.), data associated with received tag responses (e.g., received signal strength indicator or RSSI, angle-of-arrival, phase, a Doppler parameter or shift of the response, response timing, data included in the response), or any other suitable technique or parameter. In some embodiments, the tag tracking system may use physical configuration information associated with the locations 1114/1116 and/or zone 1110 and information about the tag (e.g., tag or item type) and to refine tag location estimates. For example, a tag attached to a large garment may be more likely to be located on a hanging rack than on the floor. Similarly, the tag tracking system may use historical detection data associated with a detected tag as well as other data associated with the tag to refine tag location estimates. For example, a tag that had been present at a particular location for some period of time but has recently been purchased may be more likely to have moved to a different location. Data associated with received tag responses may be used to estimate tag movement distances, rates, and/or directions, which may then be used to refine tag location estimates. For example, a detected Doppler parameter or shift associated with a tag response may be used to determine whether a tag is moving toward or away from a reader. Tag response timing information (e.g., the time between when a reader transmits a signal and when a response is received from a tag) may be used to determine the distance between a reader and a responding tag. Data included in a tag response, such as an identifier, a flag value, or other data stored on a tag, may be used to determine some characteristic about the tag or its associated item (e.g., a tag or item RF characteristic), which may be used to refine other detected data associated with the received tag response, or may itself be used to estimate tag movement parameters.

In some embodiments, expected success rates may be based on prior success rates, calculated success rates, and/or other parameters. A prior success rate is a previously-determined success rate of a tag at a particular location. A calculated success rate is a success rate that may be calculated based on a prior success rate of the tag at a different location, a prior success rate of a different tag at the same location, and/or an independently-computed success rate of an imaginary tag, and may be adjusted based on one or more environmental or tag parameters. Such environmental and/or tag parameters may include a prior location of a tag, a prior movement (direction, speed, velocity, and/or distance) of a tag, an identifier associated with a tag, data received from a tag, a noise characteristic of a particular location and/or a zone, and/or a physical characteristic associated with the location and/or zone. Each of these parameters may affect the calculated success rate in one or more ways. For example, a tag's prior location, movement, and the associated noise and/or physical characteristics may affect tag visibility and therefore calculated success rates. Noise characteristics may include, for example, the presence of other RF emitters or reflectors, such as other readers, tags, radios, electronic devices, and the like. Physical characteristics may include the physical configuration of the location or surrounding environment, the presence of structures that amplify and/or attenuate propagating RF signals, the presence of materials that amplify and/or attenuate propagating RF signals, and the like. In some embodiments, a tag tracking system may compute calculated success rates based on an identifier associated with the tag (for the tag and/or an associated item) and/or data received from the tag. For example, different tag or item types may affect tag visibility, and the tag tracking system may be able to identify tag and/or item type based on the received identifier and/or data.

Figure 12:
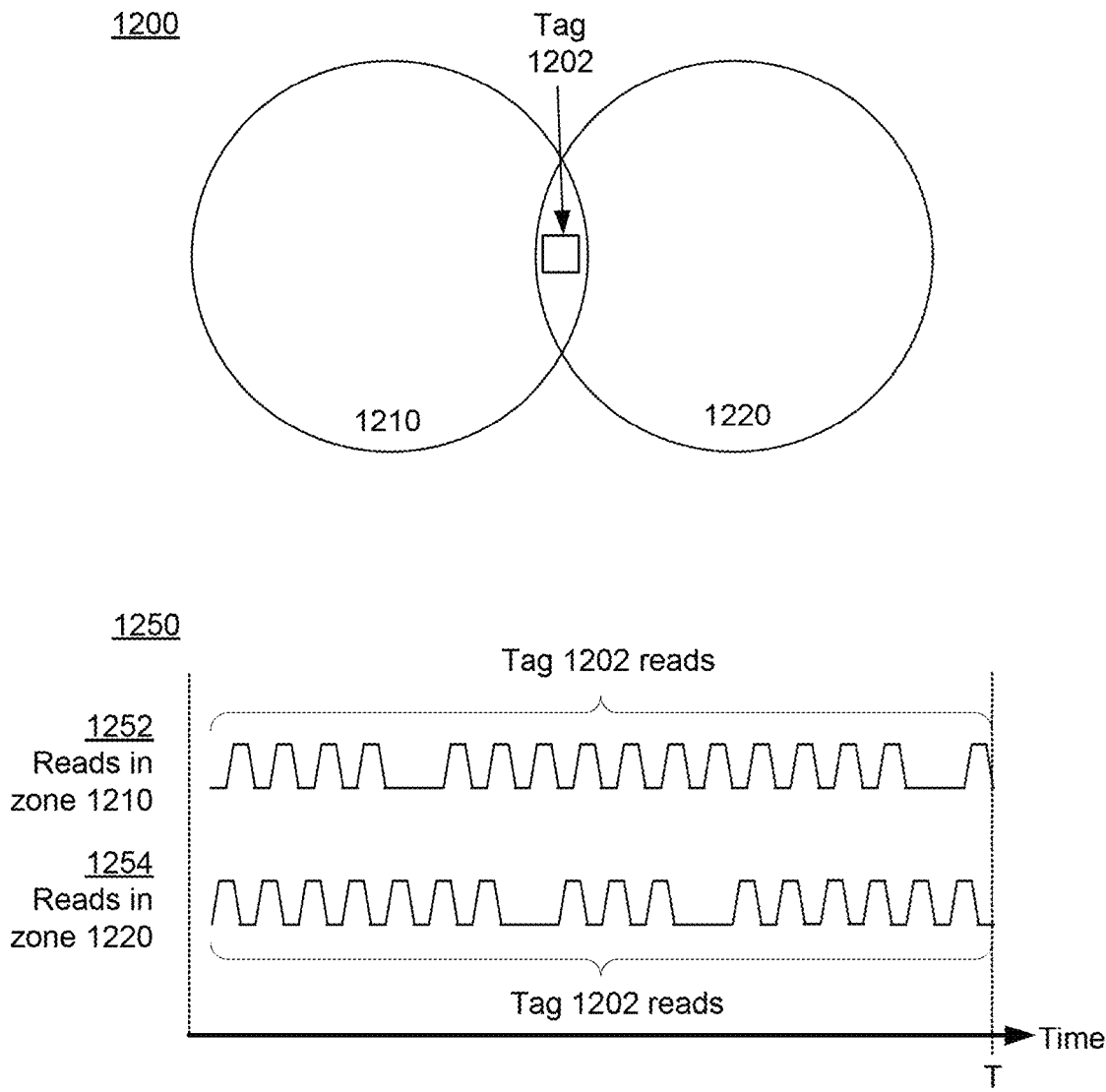
FIG. 12 depicts how success rates associated with reading a tag in different zones may be used to determine the location of the tag.

In some embodiments, tag tracking systems may use the relationship between tag success rate and location within a zone described above to refine tag location estimation in situations where multiple, overlapping zones are present. FIG. 12 depicts how success rates associated with reading a tag in different zones may be used to determine the location of the tag. Diagram 1200 is a top-down view of tag 1202 and two at least partially overlapping zones 1210 and 1220. Tag 1202 is substantially equidistant from the centers of zones 1210 and 1220, and is located within the intersection or overlapping portion of the two overlapping zones. Because tag 1202 is within both zones, tag 1202 may be read by the readers and/or antennas associated with both zones 1210 and 1220. Diagram 1250 illustrates read characteristics 1252 and 1254 of tag 1202 in zones 1210 and 1220, respectively, over time T. As tag 1202 is near the periphery of both zones 1210 and 1220, tag 1202 may not always be successfully read by the readers or antennas covering each zone, as depicted by read characteristics 1252 and 1254. However, because tag 1202 is substantially equidistant from the centers of both zones 1210 and 1220, the success rate of tag 1202 within zone 1210 may be substantially similar to the success rate of tag 1202 within zone 1220, where both success rates are computed over time T, assuming that the readers covering zones 1210 and 1220 have similar tag read speeds. For example, in diagram 1250 the read counts of tag 1202 are 16 in both zones 1210 and 1220 over time T. If zone 1210 is substantially similar to zone 1220, then a tag tracking system may use the similar success rates of tag 1202 in zones 1210 and 1220 to conclude that tag 1202 is equidistant from the centers of zones 1210 and 1220. In some embodiments, the tag tracking system may use an averaging method, such as a weighted averaging or centroid-averaging method, and/or an interpolation method to combine the success rates of tag 1202 in zones 1210 and 1220 to determine its location.

Figure 13:
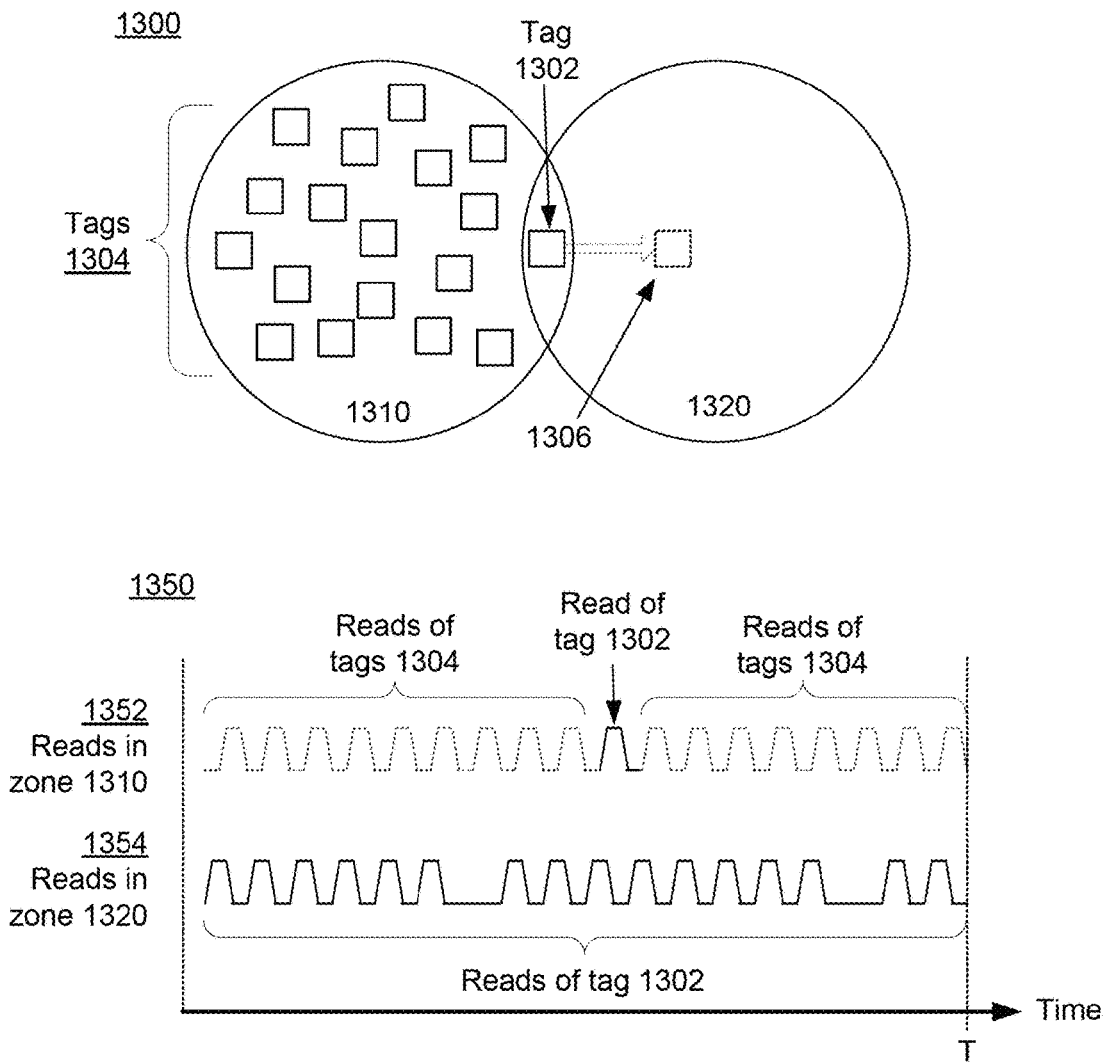
FIG. 13 depicts how zones with different numbers of tags may affect tag location using read-rate-based success rates.

However, using success rates based solely on read rate to locate tags may become more complicated if other tags are present. FIG. 13 depicts how zones with different numbers of tags may affect tag location using read-rate-based success rates. The situation depicted in diagram 1300 is somewhat similar to the situation depicted in diagram 1200 in that it is a top-down view of two at least partially overlapping zones 1310 and 1320, with a tag 1302 substantially equidistant from the centers of zones 1310 and 1320 and located within the intersection or overlapping portion of the two zones 1310 and 1320. However, diagram 1300 differs because a number of other tags 1304 are also present in zone 1310. In this situation, as depicted in diagram 1350, read characteristic 1354 of tag 1302 in zone 1320 is similar to the read characteristic 1254 in FIG. 12, with tag 1302 read 16 times within time T. Read characteristic 1352 in zone 1310 now includes reads from tags 1304, and accordingly tag 1302 may only be read once in the same time T. If a tag tracking system uses success rates based only on read rates to determine tag location, then the tag tracking system may erroneously determine that tag 1302 is significantly closer to the center of zone 1320 than to the center of zone 1310 (for example, at location 1306), because the read-rate-based success rate of tag 1302 over time T is higher in zone 1320 than in zone 1310.

In some embodiments, this issue may be addressed by computing tag success rates with different opportunity metrics. For example, one opportunity metric may be a number of read opportunities, where a read opportunity represents a specific opportunity in which a reader has had a chance to read a tag. In this situation, the opportunity metric may represent a discrete number of read opportunities, and the tag success rate may be computed by dividing a tag read count by the opportunity metric. One example of a read opportunity is an inventory cycle. An inventory cycle may be defined as a time duration or event during which a tag tracking system has attempted to inventory the tags visible within a particular zone before (a) determining that all tags in the zone have been inventoried, (b) determining that no other tags in the zone are to be inventoried, and/or (c) attempting to inventory tags within another zone.

FIG. 14 depicts an example of an inventory cycle 1400 according to embodiments. Specifically, inventory cycle 1400 is depicted as an inventorying sequence using Query, QueryAdj, and/or QueryRep commands according to the Gen2 Specification, although in other embodiments an inventory cycle may be implemented using any suitable technique or set of commands. Inventory cycle 1400 begins when a tag tracking system transmits (via a reader or reader antenna) a Query command at time 1430 to a population of tags 1402-1410 within a particular zone, causing the tags to each generate a slot counter value, depicted as a numeral in each tag. Tag 1402 may generate a slot counter value of zero, whereas tags 1404-1410 may each generate nonzero slot counter values. Accordingly, tag 1402 responds to the Query command, and the tag tracking system inventories tag 1402 (denoted by the "X" in tag 1402) and prevents tag 1402 from participating in subsequent inventorying for a period of time (e.g., by flipping a session flag). Subsequently, at time 1422 the tag tracking system transmits a QueryRep, causing the uninventoried tags 1404-1410 to decrement their respective slot counter values. Tag 1406 may now have a slot counter value of zero and respond to the QueryRep command, and the tag tracking system may inventory tag 1406 and prevent tag 1406 from participating in subsequent inventorying. At time 1424, the tag tracking system again transmits a QueryRep, causing the slot counter value of tag 1408 to decrement to zero, and then inventories tag 1408.

At time 1426, the tag tracking system again transmits a QueryRep, causing the slot counter values of both tag 1404 and tag 1410 to decrement to zero. This may result in a collision where both tags attempt to respond to the tag tracking system. The tag tracking system may be able to detect that a collision has occurred, and in some embodiments may be able to recover one or more collided tag responses. In this particular case, the tag tracking system may be unable to recover any of the collided tag responses, and may therefore transmit a QueryAdj command at time 1428 to cause the uninventoried tags to generate new slot counter values. Tag 1410 may generate a new slot counter value of zero in response to the QueryAdj, and therefore may respond to the tag tracking system for inventorying. At time 1430, the tag tracking system may again transmit a QueryRep, causing the slot counter value of tag 1404 to decrement to zero, and then inventory tag 1404.

At time 1432, the tag tracking system transmits QueryRep again. Since all tags in the population have been inventoried, no tags may respond to the QueryRep. The tag tracking system may then transmit a QueryAdj with a slot value of zero to determine whether any uninventoried tags are present. A QueryAdj command with a slot value of zero causes all uninventoried tags to generate the same slot counter value, resulting in a single tag response (if only one uninventoried tag is visible), a collided response (if multiple uninventoried tags are visible), or no response (if no uninventoried tags are visible). Upon receiving no response, the tag tracking system may determine that all of the tags have been inventoried. In some embodiments, the tag tracking system may transmit multiple QueryAdj commands to ensure that no uninventoried tags remain.

Once the tag tracking system has determined that any of the conditions for ending the inventory cycle has been met (for example, determining that all tags have been inventoried, determining that no other tags are to be inventoried, or determining that tags in another zone are to be inventoried), the tag tracking system may end the inventory cycle. Subsequently, the tag tracking system may then begin another inventory cycle in the zone, may begin an inventory cycle in another zone, or may halt inventorying for a time. In some embodiments, the tag tracking system may consider the time elapsed between the start of an inventory cycle (for example, time 1420) and the end of the inventory cycle (for example, time 1434 or after a subsequent QueryAdj) as the time duration of that inventory cycle. In some embodiments, inventory cycle duration may be at least partially predetermined or dynamically updated. For example, the tag tracking system may determine that a subsequent inventory cycle should have a minimum time duration based on the number of unique tags detected during a previous inventory cycle.

After the conclusion of one or more inventory cycles, the tag tracking system may then calculate the success rate for a particular tag and a particular zone. In one embodiment, the tag tracking system may calculate the success rate for a tag in a zone by dividing the read count for that tag in that zone over a particular time interval by the number of completed inventory cycles performed in that particular time interval and in that zone.

Figure 15:
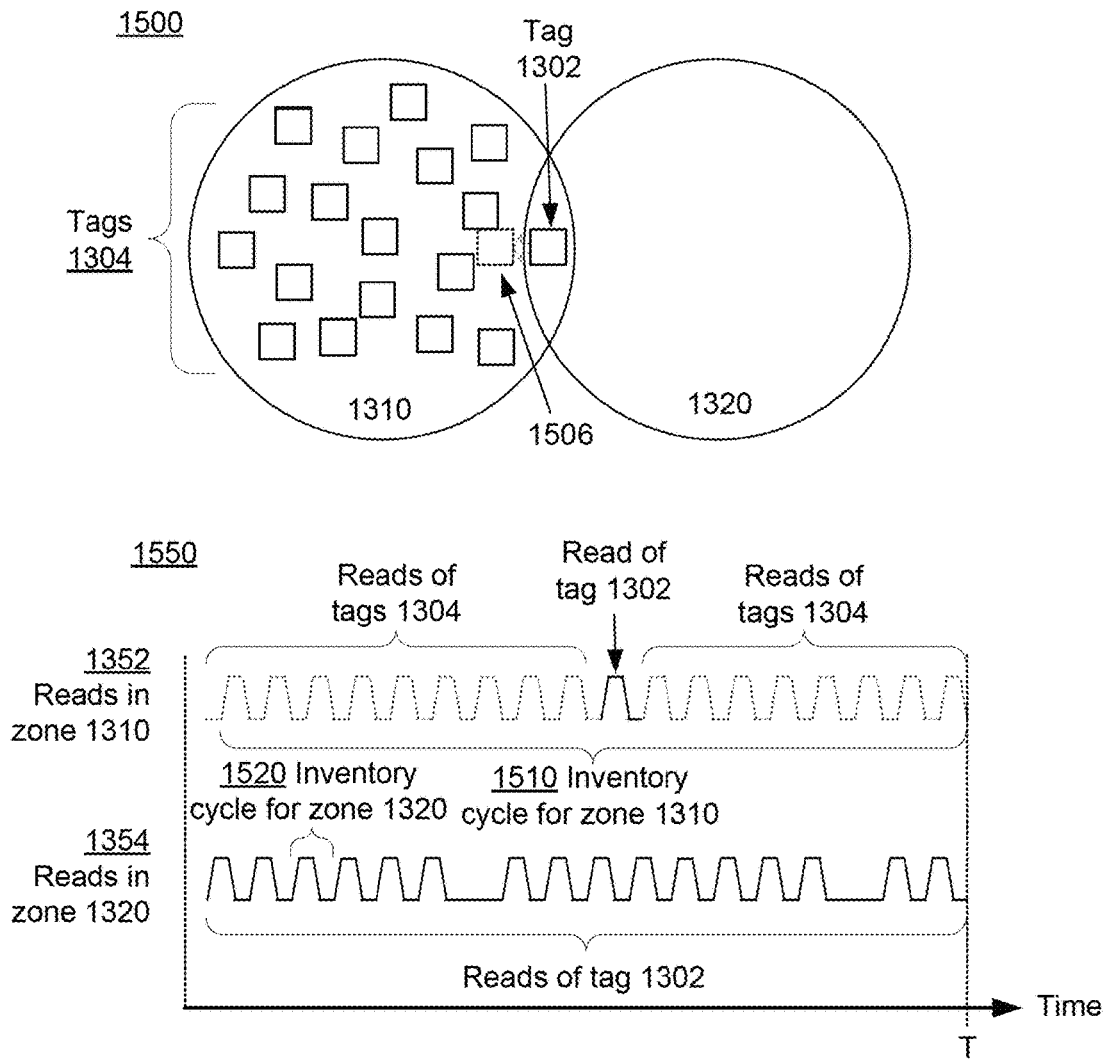
FIG. 15 depicts how inventory cycles may be used to calculate success rates for tag location determination.

FIG. 15 depicts how inventory cycles may be used to calculate success rates for tag location determination. Diagrams 1500 and 1550 are similar to diagrams 1300 and 1350 in FIG. 13. Diagram 1500 is a top-down view of overlapping zones 1310/1320, and depicts tag 1302 substantially equidistant from the centers of and located within the intersection or overlapping portion of zones 1310 and 1320 as well as tags 1304 present in zone 1310. Diagram 1550 depicts both read characteristic 1352 of tag 1302 and tags 1304 in zone 1310 and read characteristic 1354 of tag 1302 in zone 1320.

In FIG. 15, the tag tracking system may use the number of completed inventory cycles in each zone as opportunity metrics. Inventory cycles in zone 1310 may be relatively long due to the many tags (tag 1302 and tags 1304) visible and available for inventorying. Accordingly, during a time interval T, the tag tracking system may only complete a single inventory cycle 1510 in zone 1310, resulting in an opportunity metric for zone 1310 of "1". The tag tracking system may then calculate a success rate for tag 1302 in zone 1310 by dividing the number of reads of tag 1302 in zone 1310 during time interval T ("1") by the opportunity metric associated with zone 1310 (also "1"), resulting in a success rate of 1.

In contrast, an inventory cycle in zone 1320 (e.g., inventory cycle 1520) may be relatively short because there is only one tag (tag 1302) visible and available for inventorying. Accordingly, the tag tracking system may be able to complete 18 inventory cycles in zone 1320 for the same time interval T, resulting in an opportunity metric for zone 1320 of "18". The tag tracking system may then calculate the success rate for tag 1302 in zone 1320 by dividing the number of reads of tag 1302 in zone 1320 during time interval T ("16") by the opportunity metric associated with zone 1320 ("18"), resulting in a success rate of 8/9.

When the tag tracking system uses the calculated success rates to determine the location of tag 1302, it may determine that tag 1302 is at location 1506, which is closer to the center of zone 1310 than the center of zone 1320. The magnitude of the location error when using the calculated success rates is significantly smaller than when using read rates, but still present, because the success rate calculation for tag 1302 in zone 1310 only included data from one inventory cycle. Using tag read counts from multiple inventory cycles may improve success rate calculation. In some embodiments, success rates may be averaged or otherwise combined over a number of different inventory cycles, because there may be inventory cycles in which a tag is not read. For example, read characteristic 1354 includes several failed attempts to read tag 1302, similar to read characteristic 1156 in FIG. 11. As described in FIG. 11, these failures may provide information about the location of a tag within a zone. Combining success rate data from multiple inventory cycles in multiple zones may improve the accuracy of the tag location process.

In some embodiments, the tag tracking system may compute opportunity metrics in other ways. For example, the tag tracking system may compute opportunity metrics based on one or more of an inventory-cycle duration, an inventory-cycle rate, and/or an inventoried tags parameter. An inventory-cycle duration is the length of a time interval that is proportional to the time duration of a completed inventory cycle, and may increase as the population of visible tags increases. An inventory-cycle rate is inversely proportional to the inventory-cycle duration, and may decrease as the population of visible tags increases. An inventoried tags parameter may be proportional to the number of unique tags inventoried within a particular zone during a particular time duration, and may increase as the population of visible tags increases. Tag success rates (or a parameter correlated with tag success rates) may then be computed by multiplying tag read counts (or tag read rates, which are tag read counts over time) by inventory-cycle durations or inventoried tags parameter, or by dividing tag read counts/tag read rates by inventory-cycle rates.

Figure 16:
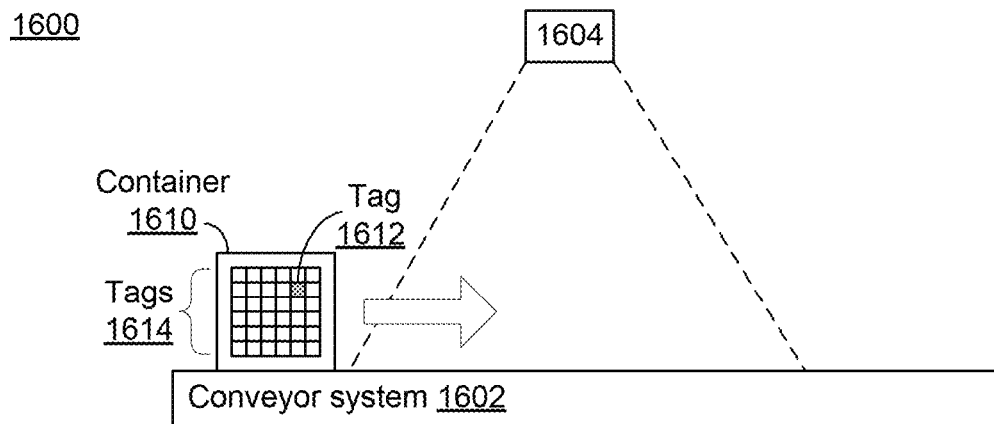
FIG. 16 depicts how a relatively strong tag in a tag population may have a read rate that varies based on the location of the tag population.
Figure 16:
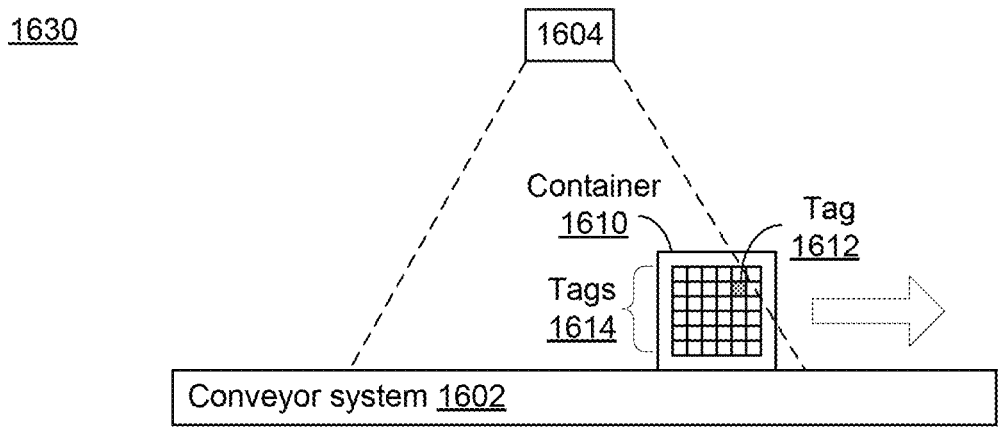
Figure 16:
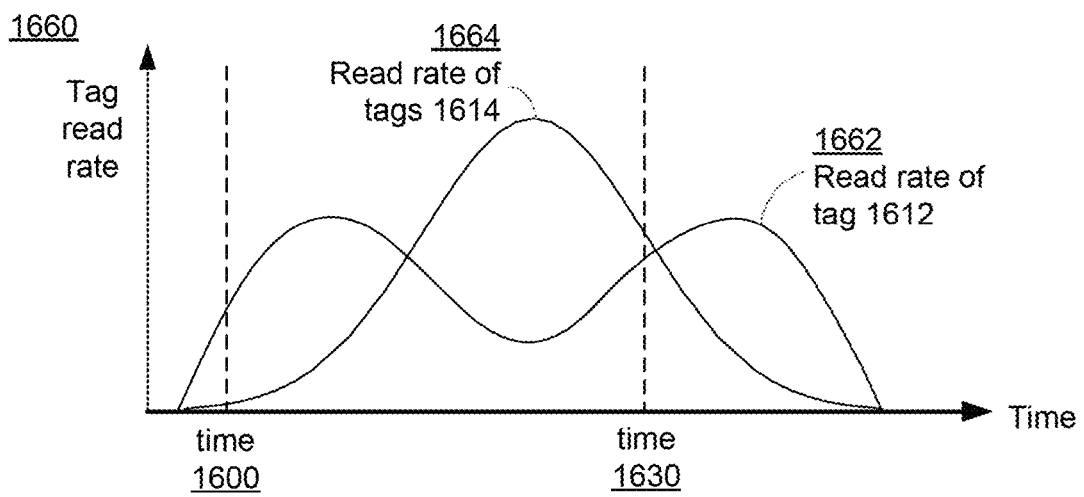

While tag location above is described in the context of a stationary tag, the same concept may be applied to tags in motion. FIG. 16 depicts how a relatively strong tag in a tag population may have a read rate that varies based on the location of the tag population. At a first time 1600, a container 1610 may be moving toward the right on conveyor system 1602 and entering the field-of-view of a reader 1604. Container 1610 includes a number of tags 1614 that may be inventoried when container 1610 passes through the field-of-view of reader 1604. Container 1610 may also include a particular tag 1612 that happens to be visible to reader 1604 before the other tags 1614. For example, tag 1612 may be significantly closer, may have an orientation particularly well suited for communicating with reader 1604, or may be attached to an item that enhances the coupling of the tag 1612 to signals from reader 1604.

Diagram 1660 depicts the rate at which reader 1604 reads tags over time, and shows a read rate characteristic 1662 indicating the rate at which reader 1604 reads tag 1612 over time and a read rate characteristic 1664 indicating the rate at which reader 1604 reads tags 1614 over time. At time 1600, as described above, tag 1612 may be visible to reader 1604, whereas tags 1614 may not be particularly visible to reader 1604. Accordingly, at time 1600 read rate characteristic 1662 of tag 1612 is relatively high and increasing, because tag 1612 is approaching reader 1604. In contrast, at time 1600 read rate characteristic 1664 of tags 1614 is relatively low, because the tags 1614 are not yet particularly visible to reader 1604.

As container 1610 moves within and passes through the field of view of reader 1604, read rate characteristic 1662 may increase to a first maximum as the visibility of tag 1612 to reader 1604 improves. Subsequently, as tags 1614 become more visible to reader 1604, read rate characteristic 1662 may decrease as read rate 1664 of tags 1614 increases, because reader 1604 now can read the tags 1614 in addition to tag 1612. This phenomenon may be similar to the situation of FIG. 13, where the read rate of tag 1302 in zone 1310 is decreased due to the presence of tags 1304 in zone 1310.

At some point, read rate characteristic 1664 may increase to a maximum, for example when container 1610 is directly beneath reader 1604, and then may decrease as container 1610 begins to move away from reader 1604. At time 1630, as some of the tags 1614 begin to exit the field-of-view of reader 1604, read rate characteristic 1662 of tag 1612 may begin to increase as read rate characteristic 1664 of tags 1614 decreases, due to reduced competition from tags 1614. Subsequently, read rate characteristic 1662 may reach a second maximum and then begin to decrease as tag 1612 moves away from and becomes less visible to reader 1604.

The shape of read rate characteristic 1662 may be problematic when a tag tracking system attempts to locate tag 1612. For example, the tag tracking system may assume that tag 1612 is not associated with container 1610 because read rate characteristic 1662 decreases as container 1610 enters the field-of-view of reader 1604 and increases as container 1610 leaves the field-of-view of reader 1604. In some embodiments, the tag tracking system may be able to infer that a tag is associated with a container if the tag exhibits read rate maxima before and after the container passes through a zone. However, in some cases the tag tracking system may not be able to wait until after a container passes through before having to decide whether a tag is associated with the container. Moreover, the read rate of a strong tag may not be symmetrical. For example, suppose that tag 1612 is more visible when container 1610 is moving away from reader 1604 than when container 1610 is approaching reader 1604. In this situation, the read rate of tag 1612 may reach a maximum after the peak of read rate characteristic 1664, but have no corresponding maximum before the peak of read rate characteristic 1664. Accordingly, the tag tracking system may not be able to determine whether tag 1612 is associated with container 1610 or with a subsequent container.

Figure 17:
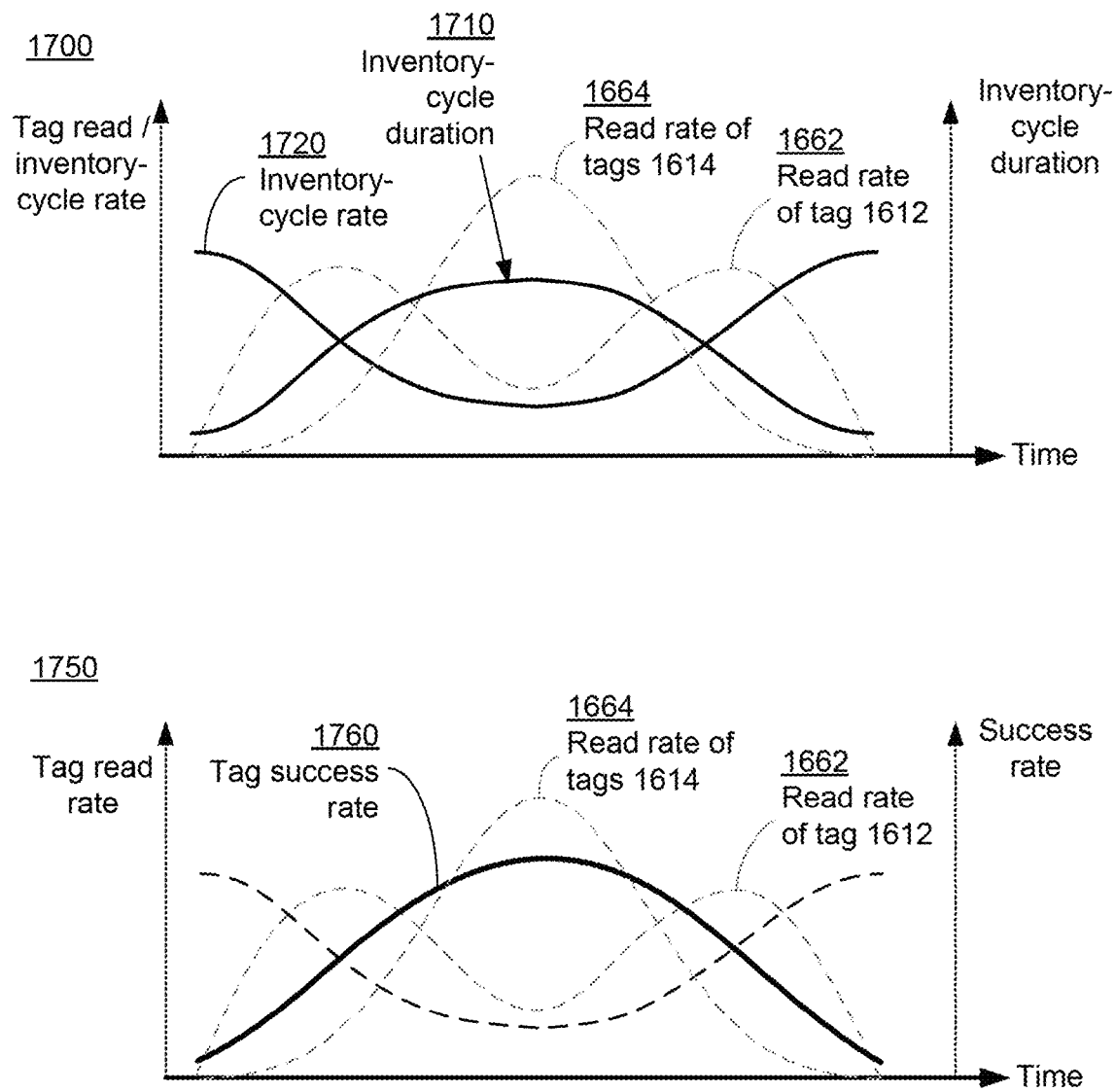
FIG. 17 depicts how a success rate of a relatively strong tag in a tag population may be determined based on inventory-cycle duration or rate to determine tag location.

In some embodiments, success rates of moving tags based on inventory cycles may be used to provide a basis for comparison. FIG. 17 depicts how the success rate of a relatively strong tag in a tag population may be determined based on inventory-cycle duration or rate to determine tag location. Diagram 1700 is similar to diagram 1660 and depicts read rate characteristic 1662 of tag 1612 and read rate characteristic 1664 of tags 1614 as a function of time. In addition, diagram 1700 also depicts an inventory-cycle duration characteristic 1710 and an inventory-cycle rate characteristic 1720. Inventory-cycle duration characteristic 1710 represents the amount of time complete inventory cycles take as a function of time, whereas inventory-cycle rate characteristic 1720 represents the speed at which reader 1604 completes inventory cycles and may be inversely proportional to inventory-cycle duration 1710. For example, when inventory cycle duration characteristic 1710 is relatively low, inventory cycle rate characteristic 1720 may be relatively high, and vice-versa.

When only tag 1612 is visible, complete inventory-cycle durations may be short and the inventory-cycle rate may be high, because only tag 1612 is being inventoried. As more tags from tags 1614 become visible, complete inventory-cycle durations may increase (and inventory-cycle rates may drop), due to the larger number of tags to be inventoried.

A success rate characteristic 1760 for tag 1612, depicted in diagram 1750, may then be computed from read rate characteristic 1662 and inventory-cycle rate characteristic 1710. In some embodiments, success rate 1760 may be computed by dividing read rate characteristic 1662 by inventory-cycle rate characteristic 1720. In other embodiments, success rate characteristic 1760 may be computed by multiplying read rate characteristic 1662 by inventory-cycle duration 1710. A tag tracking system may subsequently be able to use success rate characteristic 1760 to determine that tag 1612 is indeed associated with container 1610 and tags 1614.

FIGS. 16 and 17 are described in the context of a single container with tagged items. The same techniques described herein may be applicable for situations where multiple containers are present, with appropriate modifications to account for the presence of tags (strong or otherwise) from other containers. Similarly, while the tag tracking system in FIGS. 16 and 17 is described as tracking tags 1612 and 1614 associated with container 1610, in other embodiments the tag tracking system may track tags associated with other structures. For example, the tag tracking system may track tags associated with or contained in stationary fixtures, such as shelves, racks, displays, or similar, mobile fixtures, such as rolling carts, shelves, or similar, or movable structures, such as pallets, freight containers, and the like. As another example, the tag tracking system may track tags associated with work pieces being moved by a conveyor system, such as a vehicle chassis with individually-tagged components mounted on an overhead conveyor system or an aircraft structural component with tags on a forklift.

In some embodiments, a tag tracking system tracking tags associated with a stationary or moving structure may adjust tag read characteristics based on one or more other parameters associated with the structures. For example, the tag tracking system may adjust tag read characteristics based on structure movement speed and direction, structure physical configuration, structure orientation, and/or structure composition. The tag tracking system may be able to determine the movement speed and direction of a structure based on previous detections of tags associated with the structure, or may receive the speed and direction information from an external source, such as a conveyor system or transporter associated with the structure. Tag read characteristics may be affected by structure physical configuration due to RF blocking or interference from structural components interposed between readers and tags. Similarly, tag read characteristics may be affected by structure composition. A metallic structure may block, attenuate, and/or interfere with RF signals between readers and tags than a plastic structure.

Figure 18:
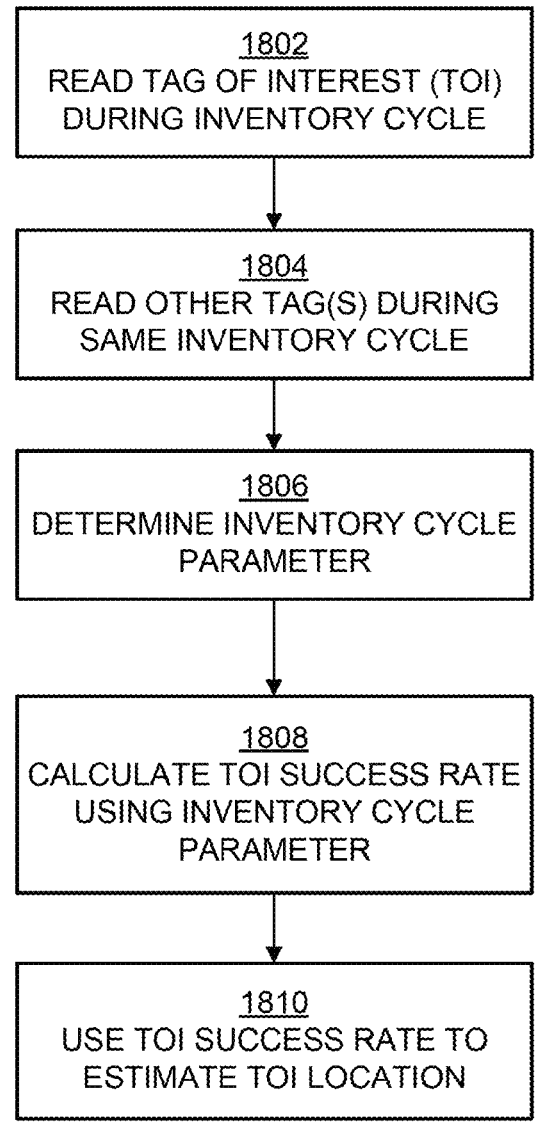
FIG. 18 is a flowchart of a process to estimate tag location.

FIG. 18 is a flowchart of a process 1800 to estimate tag location. Process 1800 may begin at step 1802, where a tag tracking system (which may include one or more readers) reads a tag of interest (TOI) during an inventory cycle. In some embodiments, the tag tracking system may read the TOI during an inventory cycle within a particular zone, as described above. At step 1804, the tag tracking system may read one or more other tags during the same inventory cycle. At step 1806, the tag tracking system determines an inventory cycle parameter, which may be a number of completed inventory cycles, a number of inventoried tags, an inventory-cycle duration, and/or an inventory-cycle rate, as described above. At step 1808, the tag tracking system may compute a TOI success rate based on the determined inventory cycle parameter, as described above. For example, the tag tracking system may determine a success rate by dividing a tag read count counted over a particular time interval by a number of inventory cycles completed in that time interval. As another example, the tag tracking system may determine the success rate by dividing a read rate of the TOI by an inventory-cycle rate.

Subsequently, at step 1810 the tag tracking system may use the success rate determined in step 1808 to estimate the location of the TOI, as described above. For example, the tag tracking system may combine the success rate with one or more other success rates associated with other zones to estimate the location of the TOI. The tag tracking system may use an averaging method (e.g., a weighted-average method or a centroid-averaging method) and/or an interpolating method to estimate the location of the TOI. In some embodiments, the tag tracking system may use other information to refine the TOI location estimation. For example, the tag tracking system may refine TOI location estimation based on zone physical configuration information, historical TOI detection, location, and/or movement data, other data associated with the TOI (e.g., purchase data, TOI type, type of item associated with the TOI, etc.), data associated with received responses from the TOI (e.g., received signal strength indicator or RSSI, angle-of-arrival, phase, a Doppler parameter, response timing, data included in the response) or any other suitable parameter. In some embodiments, the tag tracking system may use the success rates and/or other information as inputs into one or more heuristic techniques, supervised learning techniques, unsupervised learning techniques, or machine learning techniques as known to one of ordinary skill in the art to estimate tag location.

The operations described in process 1800 are for illustrative purposes only. These operations may be implemented using additional or fewer operations and in different orders using the principles described herein.

According to some embodiments, a method for a Radio Frequency Identification (RFID) system to estimate a location of an RFID tag is provided. The method may include transmitting a first inventorying RF wave to a first zone, counting a first nonzero number of response from the RFID tag in the first zone, and determining a first success rate based on the first nonzero response count and a first opportunity metric associated with the first zone. The method may further include transmitting a second inventorying RF wave to a second zone different from but overlapping the first zone, counting a second nonzero number of responses from the RFID tag in the second zone, and determining a second success rate based on the second nonzero response count and a second opportunity metric associated with the second zone. The method may further include estimating the tag location within an overlapping portion of the first and second zones based at least one a comparison of the first and second success rates.

According to other embodiments, another method for a Radio Frequency Identification (RFID) synthesized-beam reader (SBR) system to estimate a location of an RFID tag is provided. The method may include transmitting a first inventorying RF wave in a first SBR beam, receiving a first nonzero number of responses from the RFID tag in the first SBR beam, and determining a first success rate based on the first response count and a first opportunity metric. The method may further include transmitting a second inventorying RF wave in a second SBR beam, receiving a second nonzero number of responses from the RFID tag in a second SBR beam different from but overlapping the first SBR beam, and determining a second success rate based on the second response count and a second opportunity metric associated with the second SBR beam. The method may further include estimating the tag location within an overlapping portion of the first and second SBR beams based on a comparison between the first success rate and the second success rate.

According to further embodiments, a method for a Radio Frequency Identification (RFID) system to estimate a location of an RFID tag with respect to an inventory zone generated by the RFID system is provided. The method may include transmitting an inventorying RF wave in the inventory zone, counting a nonzero number of responses from the RFID tag in the inventory zone, and determining a current success rate based on the nonzero response count and an opportunity metric associated with the inventory zone. The method may further include determining an expected success rate associated with the RFID tag and estimating the tag location with respect to the inventory zone based on the current success rate and the expected success rate.

In some embodiments, counting the first and second nonzero numbers of responses of the RFID tag may include counting over first and second time intervals, respectively, and the first and second opportunity metrics may be based on the first and second time intervals, respectively. The first opportunity metric may be based on a number of inventory cycles performed while transmitting the first inventorying RF wave to the first zone and/or in the first SBR beam, or may be based on a total number of RFID tags inventoried in the first zone and/or in the first SBR beam. The first opportunity metric may be an inventory-cycle duration or an inventory-cycle rate. The methods may further include using a weighted-averaging method and/or a centroid-averaging method to estimate the tag location. Estimating the tag location may be based on the comparison and one or more of a received signal strength indicator (RSSI) associated with a response from the RFID tag, an angle-of-arrival of the response, a phase of the response, a Doppler parameter of the response, a timing of the response, and data included in the response. In some embodiments, the expected success rate may be determined based on at least one of a prior success rate and a calculated success rate and one or more of a prior location of the RFID tag, a prior movement of the RFID tag, an identifier associated with the RFID tag, data previously received from the RFID tag, a noise characteristic associated with the inventory zone, and a physical characteristic associated with the inventory zone.

According to yet further embodiments, a method for an RFID system to associated RFID tags with structures is provided. The method may include, during a first time interval, transmitting a first inventorying RF wave to a zone, receiving responses from a first number of RFID tags, and counting a first nonzero number of responses from an RFID tag. The method may further include, during a second time interval, transmitting a second inventorying RF wave to the zone, receiving responses from a second number of RFID tags, the second number different from the first number, and counting a second nonzero number of responses from the RFID tag. The method may further include determining a first success rate based on the first nonzero response count and a first opportunity metric associated with the first time interval and determining a second success rate based on the second nonzero response count and a second opportunity metric associated with the second time interval The method may further include identifying at least one structure at least partially within the zone during the first time interval and the second time interval and determining whether the RFID tag is associated with and/or associating the RFID tag with the at least one structure based at least one a comparison of the first and second success rates.

According to some embodiments, the at least one structure may include a container and/or a fixture. The at least one structure may be in motion. The first opportunity metric may be based on at least one of the first number of RFID tags and a first number of inventory cycles performed during the first time interval, and the second opportunity metric may be based on at least one of the second number of RFID tags and a second number of inventory cycles performed during the second time interval. Determining whether the RFID tag is associated with and/or associating the RFID tag with the at least one structure may be based on the comparison and a received signal strength indicator associated with a response from the RFID tag, an angle-of-arrival of the response, a phase of the response, a Doppler parameter of the response, a timing of the response, and/or data included in the response. Determining whether the RFID tag is associated with the at least one structure may be based on the comparison and a movement speed of the at least one structure, a movement direction of the at least one structure, a physical configuration of the at least one structure, a composition of the at least one structure, an orientation of the at least one structure, and a proximity of at least one other RFID tag associated with the at least one structure. The RFID system may include at least one synthesized-beam reader (SBR), and the zone may correspond to at least one beam generated by the SBR.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) system configured to estimate a location of an RFID tag within an inventory zone, the system comprising:
   an RFID reader configured to communicate wirelessly with a plurality of RFID tags; and
   a controller communicatively coupled to the RFID reader, wherein the controller is configured to:
      cause the RFID reader to transmit an inventorying RF wave in the inventory zone;
      count a nonzero number of responses from the RFID tag;
      determine an opportunity metric, wherein the opportunity metric represents a potential number of opportunities to read the RFID tag in the inventory zone and includes one of an inventory cycle duration and a number of inventoried tags;
      generate a current success rate by multiplying the response count or a parameter derived from the response count with the opportunity metric; and
      use at least the current success rate to estimate the location of the tag within a portion of the inventory zone.

2. The system of claim 1, wherein the controller is configured to estimate the tag location by comparing the current success rate to an expected success rate associated with a location in the inventory zone.

3. The system of claim 2, wherein the expected success rate is based on at least one of a prior success rate and a calculated success rate.

4. The system of claim 2, wherein the expected success rate is based on at least one of a prior location of the RFID tag, an identifier associated with the RFID tag, data previously received from the RFID tag, a noise characteristic associated with the inventory zone, and a physical characteristic associated with the inventory zone.

5. The system of claim 1, wherein the controller is further configured to estimate the tag location based on at least one of:
   a received signal strength indicator (RSSI) associated with a response from the RFID tag,
   an angle-of-arrival of the response,
   a phase of the response,
   a Doppler parameter of the response,
   a timing of the response, and
   data included in the response.

6. A system for a Radio Frequency Identification (RFID) system configured to estimate a location of a first RFID tag within an inventory zone, the system comprising:
   an RFID reader configured to communicate wirelessly with a plurality of RFID tags; and
   a controller communicatively coupled to the RFID reader, wherein the controller is configured to:
      cause the RFID reader to transmit an inventorying RF wave in the inventory zone;
      count a first nonzero number of responses from the first RFID tag;
      count a second nonzero number of responses from at least a second RFID tag in the inventory zone;
      determine an opportunity metric from at least a second response count, wherein the opportunity metric includes one of an inventory cycle duration and a number of inventoried tags;
      generate a current success rate by multiplying a first response count or a parameter derived from the first response count with the opportunity metric; and
      use at least the current success rate to estimate the location of the first RFID tag within a portion of the inventory zone.

7. The system of claim 6, wherein the controller is configured to estimate the location by comparing the current success rate to an expected success rate associated with a location in the inventory zone.

8. The system of claim 7, wherein the expected success rate is based on at least one of a prior success rate and a calculated success rate.

9. The system of claim 7, wherein the expected success rate is based on at least one of a prior location of the first RFID tag, an identifier associated with the first RFID tag, data previously received from the first RFID tag, a noise characteristic associated with the inventory zone, and a physical characteristic associated with the inventory zone.

10. The system of claim 6, wherein the controller is further configured to estimate the tag location based on at least one of:
    a received signal strength indicator (RSSI) associated with a response from the first RFID tag,
    an angle-of-arrival of the response,
    a phase of the response,
    a Doppler parameter of the response,
    a timing of the response, and
    data included in the response.

11. A system for a Radio Frequency Identification (RFID) system configured to estimate a location of an RFID tag within an inventory zone, the system comprising:
    an RFID reader configured to communicate wirelessly with a plurality of RFID tags; and
    a controller communicatively coupled to the RFID reader, wherein the controller is configured to:
       cause the RFID reader to transmit an inventorying RF wave in the inventory zone;
       count a nonzero number of responses from the RFID tag;
       determine an opportunity metric, wherein the opportunity metric is based on at least the number of inventorying attempts in the inventory zone and includes one of an inventory cycle duration and a number of inventoried tags;
       generate a current success rate by multiplying a response count or a parameter derived from the response count with to the opportunity metric; and
       use at least the current success rate to estimate the location of the RFID tag within a portion of the inventory zone.

12. The system of claim 11, wherein the controller is configured to estimate the location by comparing the current success rate to an expected success rate associated with a location in the inventory zone.

13. The system of claim 12, wherein the expected success rate is based on at least one of:

a prior success rate,
a calculated success rate,
a prior location of the RFID tag,
an identifier associated with the RFID tag,
data previously received from the RFID tag,
a noise characteristic associated with the inventory zone, and
a physical characteristic associated with the inventory zone.

14. The system of claim 11, wherein the controller is further configured to estimate the location based on at least one of:
 a received signal strength indicator (RSSI) associated with a response from the RFID tag,
 an angle-of-arrival of the response,
 a phase of the response,
 a Doppler parameter of the response,
 a timing of the response, and
 data included in the response.

\* \* \* \* \*

UNITED STATES PATENT AND TRADEMARK OFFICE
CERTIFICATE OF CORRECTION

PATENT NO. : 11,321,547 B1
APPLICATION NO. : 17/113186
DATED : May 3, 2022
INVENTOR(S) : Alberto Pesavento et al.

It is certified that error appears in the above-identified patent and that said Letters Patent is hereby corrected as shown below:

In the Specification

Column 27, Line 5, Delete "interval" and insert -- interval. --.

Column 27, Line 56, Delete "and or" and insert -- and/or --.

In the Claims

Column 30, Line 58, Claim 11, delete "with to the" and insert -- with the --.

Signed and Sealed this
Sixth Day of September, 2022

Katherine Kelly Vidal
*Director of the United States Patent and Trademark Office*